US012771717B2

(12) United States Patent
Dunjic et al.

(10) Patent No.: US 12,771,717 B2
(45) **Date of Patent: *Oct. 20, 2026**

(54) SYSTEMS AND METHODS FOR DETECTING CHANGES IN DATA ACCESS PATTERN OF THIRD-PARTY APPLICATIONS

(71) Applicant: The Toronto-Dominion Bank, Toronto (CA)

(72) Inventors: Milos Dunjic, Oakville (CA); Arthur Carroll Chow, Markham (CA); David Samuel Tax, Toronto (CA); Gregory Albert Kliewer, Barrie (CA); Anthony Haituyen Nguyen, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 75 days.

This patent is subject to a terminal disclaimer.

(21) Appl. No.: 18/651,766

(22) Filed: May 1, 2024

(65) Prior Publication Data

US 2024/0283819 A1 Aug. 22, 2024

Related U.S. Application Data

(63) Continuation of application No. 16/571,394, filed on Sep. 16, 2019, now Pat. No. 12,101,349.

(51) Int. Cl.

| | |
|---|---|
| ***H04L 9/40*** | (2022.01) |
| ***G06F 11/34*** | (2006.01) |
| ***G06Q 40/02*** | (2023.01) |

(52) U.S. Cl.

CPC ...... *H04L 63/1466* (2013.01); *G06F 11/3457* (2013.01); *G06Q 40/02* (2013.01)

(58) Field of Classification Search

CPC ............... H04L 63/1466; H04L 63/102; H04L 63/1425; G06F 11/3457; G06F 11/3668; G06Q 40/02

See application file for complete search history.

(56) References Cited

U.S. PATENT DOCUMENTS

| | | | |
|---|---|---|---|
| 8,205,259 | B2 | 6/2012 | Stute |
| 8,572,610 | B2 | 10/2013 | Davis |

(Continued)

FOREIGN PATENT DOCUMENTS

| | | | |
|---|---|---|---|
| CN | 102255776 | B | 11/2011 |
| CN | 105912934 | A | 8/2016 |

(Continued)

OTHER PUBLICATIONS

CIPO; Examiner's Report relating to CA application No. 3055486 dated Apr. 30, 2025.

(Continued)

*Primary Examiner* — Farid Homayounmehr
*Assistant Examiner* — Mudasiru K Olaegbe
(74) *Attorney, Agent, or Firm* — Rowand LLP

(57) ABSTRACT

A method for evaluating security of third-party application is disclosed. The method includes: in an automated test environment: launching a test instance of a first application; and obtaining a data access signature of the first application based on identifying at least one application state of the first application and account data retrieved by the first application from a user account at a protected data resource in the at least one application state; receiving, from a client device associated with the user account, an indication of access permissions for the first application to access the user account for retrieving account data; detecting a change in the data access signature of the first application; and in response to detecting the change in the data access signature of the first application, notifying the user of the detected change. The data access signature may be determined using artificial intelligence.

20 Claims, 13 Drawing Sheets

(56) References Cited

U.S. PATENT DOCUMENTS

| | | | |
|---|---|---|---|
| 8,850,526 B2 | 9/2014 | Jayaraman et al. | |
| 8,918,876 B2 | 12/2014 | Larsson et al. | |
| 9,215,074 B2 | 12/2015 | Wyatt et al. | |
| 9,449,181 B1 | 9/2016 | Umapathy | |
| 9,838,830 B2 | 12/2017 | Lyons | |
| 10,069,835 B2 | 9/2018 | Wong et al. | |
| 2010/0115614 A1 | 5/2010 | Barile et al. | |
| 2010/0269044 A1* | 10/2010 | Ivanyi | H04L 67/306 709/224 |
| 2014/0007222 A1* | 1/2014 | Qureshi | H04L 67/10 726/16 |
| 2014/0337436 A1 | 11/2014 | Hoagland | |
| 2016/0005029 A1 | 1/2016 | Ivey | |
| 2017/0124326 A1* | 5/2017 | Wailly | G06F 9/45558 |
| 2017/0317898 A1 | 11/2017 | Candito et al. | |
| 2018/0032736 A1 | 2/2018 | Inagaki | |
| 2018/0041595 A1 | 2/2018 | Dintenfass | |
| 2018/0095857 A1 | 4/2018 | Sarir | |
| 2018/0144138 A1* | 5/2018 | Zhang | G06F 21/577 |
| 2018/0165183 A1* | 6/2018 | Kremp | G06F 11/3688 |
| 2018/0330096 A1* | 11/2018 | Breindel | A63F 13/352 |
| 2019/0005467 A1 | 1/2019 | Varagani et al. | |
| 2019/0108358 A1 | 4/2019 | Navda et al. | |
| 2020/0067906 A1* | 2/2020 | Florez | H04L 63/0815 |
| 2020/0067907 A1* | 2/2020 | Avetisov | H04L 67/133 |
| 2020/0074114 A1* | 3/2020 | Cheng | G06F 21/57 |
| 2021/0058395 A1* | 2/2021 | Jakobsson | H04L 67/306 |
| 2021/0073097 A1* | 3/2021 | Upadhyay | G06F 11/0757 |

FOREIGN PATENT DOCUMENTS

| | | |
|---|---|---|
| CN | 107454102 A | 12/2017 |
| WO | 2015083115 A2 | 11/2015 |

OTHER PUBLICATIONS

CA Office Action dated Mar. 9, 2026; CA Application No. 3,055,486.

Fleishman, G., Here's How To Track The Smartphone Apps That Are Tracking You, https://www.fastcompany.com/40407424/smartphone-apps-are-tracking-you-and-heres-how-to-monitor-what-they-know; published May 30, 2017; Fast Company, retrieved Sep. 16, 2019.

* cited by examiner

SYSTEMS AND METHODS FOR DETECTING CHANGES IN DATA ACCESS PATTERN OF THIRD-PARTY APPLICATIONS

CROSS-REFERENCE TO RELATED APPLICATION

This application is a continuation of U.S. patent application Ser. No. 16/571,394 filed on Sep. 16, 2019, the contents of which are incorporated herein by reference.

TECHNICAL FIELD

The present disclosure relates to data security and, in particular, to systems and methods for evaluating security of third-party applications that request to gain access to a protected data resource.

BACKGROUND

Private user data may be stored in a protected data resource, such as a secure database. Typically, an access control system would be implemented to prohibit unauthorized access of user data. An access control system may, for example, perform authentication of users and access approval for a protected data resource.

In some contexts, users may wish to grant permission to third-parties to access their data at a protected data resource. For example, a user may provide, to a third-party application, their login credentials (i.e. username and password) for accessing their account in a protected database, and the third-party application may use those login credentials to authenticate to and retrieve account data from the protected database. The user's input of the login credentials represents, in effect, their indication of consent to the release of data to the third-party application. Upon successful authentication, the access control system allows the requesting third-party application to gain access to the user's account in the protected database.

Third-party access of protected user data may present various privacy and security challenges. For example, if a third-party application (or associated server) is compromised, user login credentials may be appropriated by rogue parties that might use the information to complete fraudulent transactions, perpetrate identity theft, etc. As another example, even when users provide consent for a third-party application to gain access to their private data, it may be difficult for the users to appreciate potential security risks, such as data breach and misuse of data, associated with granting such access.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
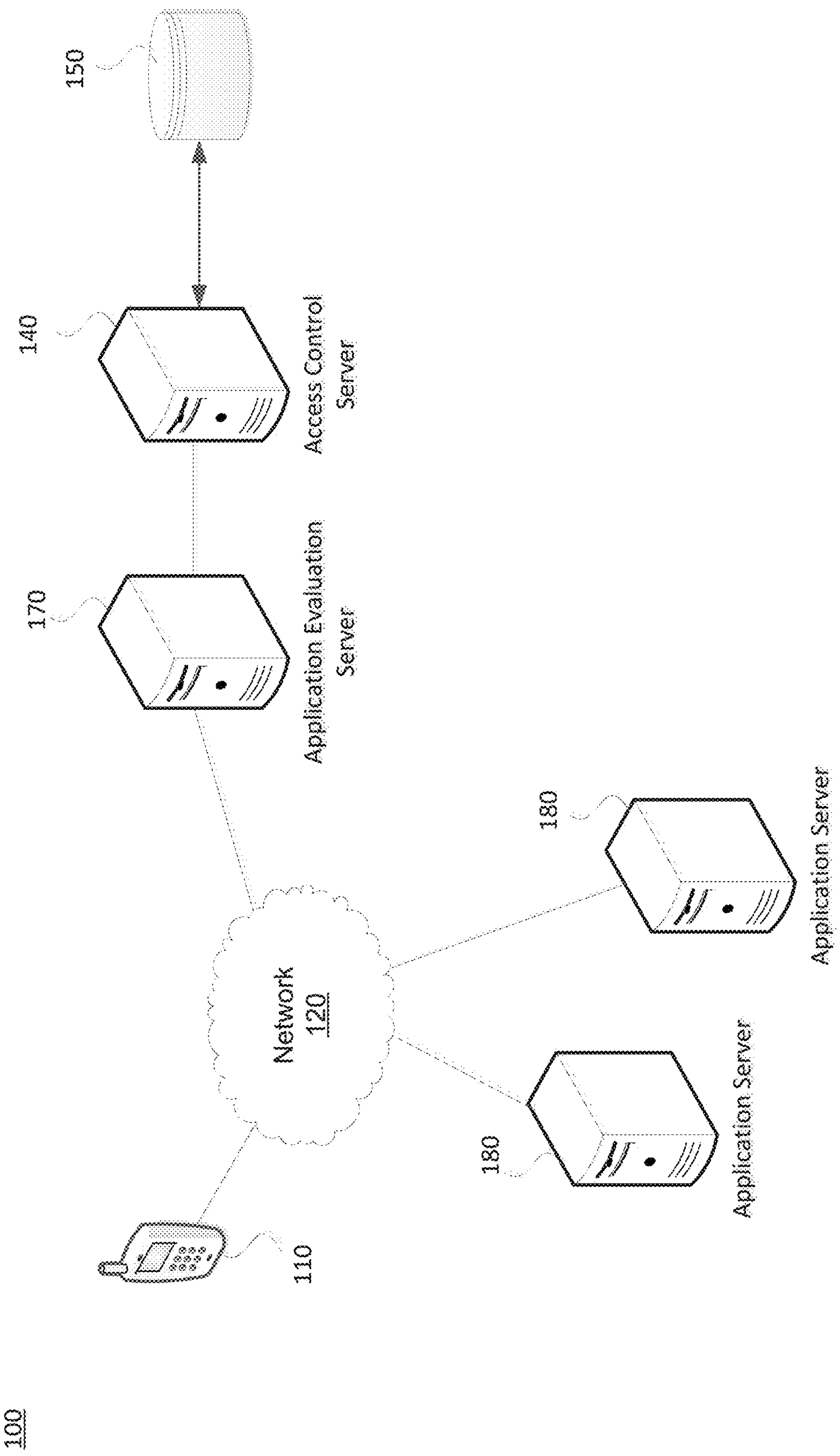
FIG. 1 is a schematic operation diagram illustrating an operating environment of an example embodiment.

In an aspect, the present disclosure describes a computing system for processing requests from a third-party application to access a protected data resource. The computing system includes a communications module communicable with an external network, a memory, and a processor coupled to the communications module and the memory. The processor is configured to: receive, from a first application, a request to obtain first account data for a user account associated with a protected data resource; generate fake data for at least a portion of the requested first account data; provide, to the first application, a first data set in response to the request, the first data set including at least the generated fake data; monitor use of the first data set by the first application; detect a trigger condition indicating misuse of account data based on monitoring use of the first data set by the first application; in response to detecting the trigger condition, generate a notification identifying the misuse of account data; and transmit the notification to a computing device associated with an application user.

In some implementations, the first data set may include fake historical transactions data associated with the user account, the fake historical transactions data including data for at least one fake transfer operation of transferring value to or from the user account.

In some implementations, the at least one fake transfer operation may include a first set of transfer operations representing transfer of a first cumulative value from the user account and a second set of offsetting transfer operations representing transfer of a second cumulative value to the user account, the second cumulative value being equal to the first cumulative value.

In some implementations, the data for the at least one fake transfer operation may include one or more of: a value transferred by the at least one fake transfer operation; a date associated with the at least one fake transfer operation; a transfer type of the at least one fake transfer operation; and a transfer identifier of the at least one fake transfer operation.

In some implementations, fake data may be generated for only a subset of the requested first account data and the first data set may comprise account data for a real user account and the generated fake data for the subset of the requested first account data.

In some implementations, generating the fake data may comprise: generating a first subset of fake account data representing control data; and generating a second subset of fake account data representing test data, the second subset being different from the first subset in only a single data parameter, and detecting the trigger condition indicating misuse of account data may comprise detecting that a first output of the first application which is based on use of the first subset does not differ from a second output of the first application which is based on use of the second subset.

In some implementations, monitoring the use of the first data set may comprise: obtaining output data generated by the first application; and evaluating the output data of the first application to determine whether the generated fake data affects the output data.

In some implementations, obtaining the outputs of the first application may comprise retrieving data presented in application pages of a graphical user interface associated with the first application.

In some implementations, monitoring the use of the first data set may comprise performing a keyword search of resources in a network based on a search query including the generated fake data.

In some implementations, the notification may include a risk score indicating a level of risk associated with the first application.

In another aspect, the present disclosure describes a processor-implemented method for processing requests from a third-party application to access a protected data resource. The method includes: receiving, from a first application, a request to obtain first account data for a user account associated with a protected data resource; generating fake data for at least a portion of the requested first account data; providing, to the first application, a first data set in response to the request, the first data set including at least the generated fake data; monitoring use of the first data set by the first application; detecting a trigger condition indicating misuse of account data based on monitoring use of the first data set by the first application; in response to detecting the trigger condition, generating a notification identifying the misuse of account data; and transmitting the notification to a computing device associated with an application user.

In another aspect, the present disclosure describes a computing system for evaluating a security level of a third-party application. The computing system includes a communications module communicable with an external network, a memory, and a processor coupled to the communications module and the memory. The processor is configured to: launch, in an automated test environment, a test instance of a first application; detect at least one data retrieval operation by the first application of retrieving data from a protected data resource; for each of the at least one data retrieval operation, identify an application state of the first application at a time of detecting the at least one data retrieval operation; determine a data access pattern for the first application of accessing the protected data resource based on the at least one data retrieval operation and application states of the first application associated with the at least one data retrieval operation; and present the data access pattern for the first application on a client device associated with a user.

In some implementations, the processor may be further configured to create a test user account associated with the protected data resource, the test user account including fake user account data, and detecting the at least one data retrieval operation may comprise: receiving, from the first application, a request to obtain account data for a user account associated with the protected data resource; and providing, to the first application, a first data set in response to the request, the first data set including at least the fake user account data of the test user account.

In some implementations, the first data set may include fake historical transactions data associated with the test user account, the fake historical transactions data including data for at least one fake transfer operation of transferring value to or from the test user account.

In some implementations, identifying an application state of the first application may comprise determining an execution state of the first application at a time of detecting a data retrieval operation.

In some implementations, determining the execution state of the first application may comprise determining that the first application is not being executed, and the processor may be further configured to determine a frequency of data retrieval by the first application from the protected data resource.

In some implementations, determining the execution state of the first application may comprise determining that the first application is being executed, and detecting the at least one data retrieval operation by the first application may comprise determining that the at least one data retrieval operation is performed by the first application only in response to a user-initiated action in the first application.

In some implementations, the user-initiated action in the first application may comprise a user selection of a functionality associated with the first application.

In some implementations, the processor may be further configured to cause the first application to perform a plurality of predetermined operations, and detecting the at least one data retrieval operation by the first application may comprise determining that the at least one data retrieval operation is performed by the first application in response to select ones of the plurality of predetermined operations.

In some implementations, the processor may be further configured to assign, to the first application, a risk score that is based on the data access pattern for the first application In some implementations, the automated test environment may comprise an emulator for an operating system associated with the first application.

In another aspect, the present disclosure describes a processor-implemented method for evaluating a security level of a third-party application. The method includes: launching, in an automated test environment, a test instance of a first application; detecting at least one data retrieval operation by the first application of retrieving data from a protected data resource; for each of the at least one data retrieval operation, identifying an application state of the first application at a time of detecting the at least one data retrieval operation; determining a data access pattern for the first application of accessing the protected data resource based on the at least one data retrieval operation and application states of the first application associated with the at least one data retrieval operation; and presenting the data access pattern for the first application on a client device associated with a user.

In another aspect, the present disclosure describes a computing system for evaluating a security level of a third-party application. The computing system includes a communications module communicable with an external network, a memory and a processor coupled to the communications module and the memory. The processor is configured to: in an automated test environment: launch a test instance of a first application; and obtain a data access signature of the first application based on identifying at least one application state of the first application and account data retrieved by the first application from a user account at a protected data resource in the at least one application state; receive, from a client device associated with the user account, an indication of access permissions for the first application to access the user account for retrieving account data; detect a change in the data access signature of the first application; and in response to detecting the change in the data access signature of the first application, notify the user of the detected change.

In some implementations, the processor may be further configured to store the data access signature in association with the access permissions for the first application to access the user account.

In some implementations, the at least one application state of the first application may comprise an execution state of the first application.

In some implementations, the data access signature may indicate, for the at least one application state, one or more first types of account data which are accessed by the first application in the application state.

In some implementations, detecting a change in the data access signature may comprise detecting that, in the at least one application state, the first application retrieves a type of account data that is different from the one or more first types.

In some implementations, the data access signature may indicate, for the at least one application state, a first frequency of retrieval of account data from the user account.

In some implementations, detecting a change in the data access signature may comprise detecting that, in the at least one application state, the first application retrieves account data from the user account more frequently than the first frequency.

In some implementations, the processor may be further configured to: identify an application category for the first application; and assign, to the first application, a risk score that is based on the data access signature for the first application.

In some implementations, the processor may be further configured to determine a ranking of the first application relative to one or more other applications of the application category based on the risk score.

In some implementations, notifying the user of the detected change may comprise notifying the user of the determined ranking of the first application.

In another aspect, the present disclosure describes a processor-implemented method for evaluating a security level of a third-party application. The method includes: in an automated test environment: launching a test instance of a first application; and obtaining a data access signature of the first application based on identifying at least one application state of the first application and account data retrieved by the first application from a user account at a protected data resource in the at least one application state; receiving, from a client device associated with the user account, an indication of access permissions for the first application to access the user account for retrieving account data; detecting a change in the data access signature of the first application; and in response to detecting the change in the data access signature of the first application, notifying the user of the detected change.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Access control is an essential element of database security. Various security controls may be implemented for a database to safeguard the data and any operations within the database from unauthorized access. An access control system for a database typically performs functions of authentication and access approval to ensure that only authorized users can gain access to the database. For example, a private database may store account data for a plurality of user accounts, and an access control system for the database may enforce security policies to restrict access to the user account data.

An access control system may enable users to define permissions for others to access their data. In particular, users may specify which subjects are allowed to access their data and what privileges are given to those subjects. For example, account data for user accounts in a database may be accessible to only those entities that have been assigned access rights by the users associated with the accounts. The access control system for the database may limit the scope of permitted access operations based on the permissions that are defined by the users.

In some contexts, users may wish to allow third-party applications access to their data in a protected database. For example, a user may provide consent for third-party applications on their device to gain direct access to their account data. The concept of "open banking" is an example of a secure, standardized release of private user data to third-parties. Open banking allows users to grant third-party developers access to their banking data. Banks that allow such third-party access may benefit from having a larger ecosystem of applications and services that customers can use to access a wide range of banking functions. In particular, banks would not have to assume all responsibility for applications development by themselves; instead, third-party developers that are granted access to user data can develop applications that are suited for use by the banks' customers.

Generally, delegating access of user account data to third-party applications raises concerns about the security of the data and the safety level of the applications. For example, where a third-party application requests to access highly sensitive user data or to perform database operations that result in permanent changes to the user data, a balance between security of the user data and ease of control of third-party access will be desired.

As different applications generally have different demands for and use of private user data, users that provide consent for third-party applications to access their private data may not fully appreciate the risks involved in granting such access. For example, it may be difficult for users to gauge the risks of security threats, such as data leakage and unauthorized transactions, or redundant collection of data arising from third-party access of user account data.

To address such security concerns relating to third-party applications, it can be useful to evaluate the data security of the applications. The present disclosure provides techniques for assessing the security of third-party applications (or services) that are granted access, or request to gain access, to private user data stored in a protected data resource. Specifically, systems and methods are described for testing third-party applications to identify potential security risks associated with the consumption and handling of private user data by the applications.

In some embodiments of the present disclosure, fake account data is generated and used by an application evaluation system in assessing third-party applications. When the system receives, from a third-party application, a request to obtain account data for a user account associated with a protected data resource, the system generates fake data for at least a portion of the requested account data and provides a first data set containing the generated fake data to the third-party application. The system then monitors use of the first data set by the third-party application. If a trigger condition indicating misuse (or other data security threat) of the account data is detected, the system generates a notification identifying the misuse/thread and transmit the notification to a computing device associated with an application user.

In some embodiments of the present disclosure, a data access pattern associated with a third-party application is obtained by an application evaluation system. The system may perform automated test processes on a third-party application to obtain the data access pattern. For example, the test processes may be performed in an isolated testing environment, or sandbox. The system monitors for data access requests by the third-party application and identifies application states of the third-party application associated with such data access requests. A data access pattern is derived based on the data access operations by the third-party application and the associated application states, as determined by the system. The data access pattern for the third-party application is presented on a client device associated with a user. For example, the data access pattern may be displayed on a client device associated with a user when the user consents to or is requested to consent to data sharing with the third-party application.

In some embodiments of the present disclosure, techniques are described for detecting changes in a third-party application's behavior in accessing private user data. In an automated test environment, an application evaluation system launches a test instance of a third-party application and obtains a data access signature of the third-party application. The data access signature is a representation of the behavior of the third-party application in accessing data that a user has consented to share with the third-party application. In particular, the data access signature is determined based on application states of the third-party application and account data that is retrieved by the third-party application from a user account of a protected data resource in those application states. When the system receives, from a client device associated with the user account, consent for sharing data with the third-party application, the system begins to monitor the third-party application in order to identify any changes to the data access signature. If a change in the data access signature of the third-party application is detected, the user associated with the user account is automatically notified of the detected change.

FIG. 1 is a schematic diagram of an exemplary operating environment in accordance with embodiments of the present disclosure. FIG. 1 illustrates a system 100 for evaluating third-party applications and their behavior in accessing private user data that is stored in a protected data resource 150.

As illustrated, an access control server 140 and client device 110 communicate via the network 120. The client device 110 is a computing device that may be associated with an entity, such as a user or client, having resources associated with the access control server 140 and/or the protected data resource 150. The access control server 140 is coupled to the protected data resource 150, which may be provided in secure storage. The secure storage may be provided internally within the access control server 140 or externally. The secure storage may, for example, be provided remotely from the access control server 140.

The protected data resource 150 stores secure data. In particular, the protected data resource 150 may include records for a plurality of accounts associated with particular entities. That is, the secure data may comprise account data for one or more specific entities. For example, an entity that is associated with the client device 110 may be associated with an account having one or more records in the protected data resource 150. In at least some embodiments, the records may reflect a quantity of stored resources that are associated with an entity. Such resources may include owned resources and/or borrowed resources (e.g. resources available on credit). The quantity of resources that are available to or associated with an entity may be reflected by a balance defined in an associated record.

For example, the secure data in the protected data resource 150 may include financial data, such as banking data (e.g. bank balance, historical transactions data identifying transactions such as debits from and credits to an account, etc.) for an entity. In particular, the access control server 140 may be a financial institution (e.g. bank) server and the entity may be a customer of the financial institution which operates the financial institution server. The financial data may, in some embodiments, include processed or computed data such as, for example, an average balance associated with an account, an average spending amount associated with an account, a total spending amount over a period of time, or other data obtained by a processing server based on account data for the entity.

The secure data may include personal data, such as personal identification information. The personal identification information may include any stored personal details associated with an entity including, for example, a home, work or mailing address, contact information such as a messaging address (e.g. email address), and/or a telephone number, a government-issued identifier such as a social insurance number (SIN) and/or driver's license number, date of birth, age, etc.

In some embodiments, the protected data resource 150 may be a computer system that includes one or more database servers, computer servers, and the like. In some embodiments, the protected data resource 150 may be an application programming interface (API) for a web-based system, operating system, database system, computer hardware, or software library.

The client device 110 may be used, for example, to configure a data transfer from an account associated with the client device 110. More particularly, the client device 110 may be used to configure a data transfer from an account associated with an entity operating the client device 110. The data transfer may involve a transfer of data between a record in the protected data resource 150 associated with such an account and another record in the protected data resource 150 (or in another data resource such as a database associated with a different server, not shown, provided by another financial institution, for example). The other record is associated with a data transfer recipient such as, for example, a bill payment recipient. The data involved in the transfer may, for example, be units of value and the records involved in the data transfer may be adjusted in related or corresponding manners. For example, during a data transfer, a record associated with the data transfer recipient may be adjusted to reflect an increase in value due to the transfer whereas the record associated with the entity initiating the data transfer may be adjusted to reflect a decrease in value which is at least as large as the increase in value applied to the record associated with the data transfer recipient.

The system 100 includes at least one application server 180. The application server 180 may be associated with a third-party application (such as a web or mobile application) that is resident on the client device 110. In particular, the application server 180 connects the client device 110 to a back-end system associated with the third-party application. The capabilities of the application server 180 may include, among others, user management, data storage and security, transaction processing, resource pooling, push notifications, messaging, and off-line support of the third-party application. As illustrated in FIG. 1, the application server 180 is connected to the client device 110 and the access control server 140 via the network 120.

The application server 180 may provide a third-party application that utilizes secure data associated with the protected data resource 150. For example, the application server 180 may provide a personal financial management (PFM) application that utilizes financial data stored in a protected database. When the third-party application requires access to the secure data for one or more of its functionalities, the application server 180 may communicate with the access control server 140 over the network 120. For example, the access control server 140 may provide an application programming interface (API) or another interface which allows the application server 180 to obtain secure data associated with a particular entity (such as a user having an account at the protected data resource 150).

Such access to secure data may only be provided to the application server 180 with the consent of the entity that is associated with the data. For example, the client device 110 may be adapted to receive a signal indicating a user's consent to share data with the application server 180 and may, in response, send an indication of consent to the access control server 140. The access control server 140 may then configure data sharing with the application server 180. For example, the access control server 140 may provide an access token to the application server 180. The access token may be configured to allow the application server 180 to access secure data (e.g. through the API) associated with the entity that provided consent. The indication of consent may specify a sharing permission, such as type(s) of data that the application server is permitted to access. For example, the protected data resource 150 may store various types of secure data (e.g., account balance, transactions listing, personal identification data, etc.) and the indication of consent may specify the type(s) of data that the application server 180 is to be permitted to access. The access control server 140 may configure data sharing in accordance with the sharing permission.

The access token may be issued by the access control server 140 or may be issued by a separate system (referred to as a token service provider, or TSP), which may issue tokens on behalf of the access control server 140. The access token represents the authorization of a specific third-party server to access specific parts of the secure data. The access token may, for example, be an OAuth token or a variation thereof. OAuth is an open standard for token-based authentication and authorization on the Internet. The OAuth 1.0 protocol was published as RFC 5849 and the OAuth 2.0 framework was published as RFC 6749 and bearer token usage as RFC 6750. All of these documents are incorporated herein by reference.

The system 100 also includes an application evaluation server 170. The application evaluation server 170 is configured to assess the behavior of third-party applications. In particular, the application evaluation server 170 may implement automated tests for assessing the security of third-party applications that are granted access to the protected data resource 150. As shown in FIG. 1, the application evaluation server may communicate with the application server(s) 180 via the network 120. In the example embodiment of FIG. 1, the application evaluation server 170 is shown as interposed between the application server(s) 180 and the access control server 140. That is, the application evaluation server 170 may serve as an intermediary between the application server (s) 180 and the access control server 140. A request for access to the protected data resource 150 from an application server 180 may be routed first to the application evaluation server 170 prior to being transmitted to the access control server 140. The application evaluation server 170 may perform tests to assess the behavior of third-party applications which request to interface with the access control server 140 prior to forwarding, to the access control server 140, any requests by the third-party applications to access the protected data resource 150.

Figure 14:
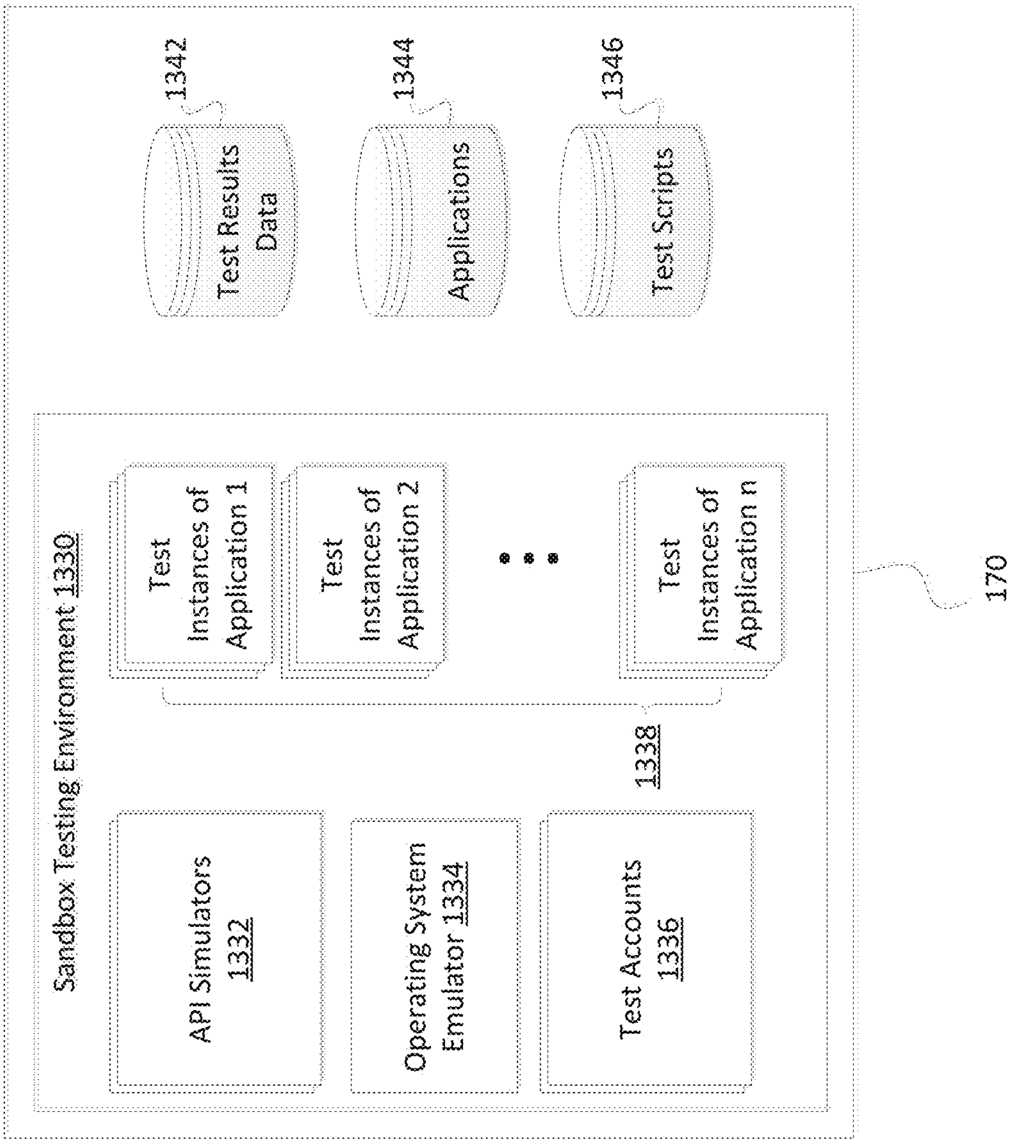
FIG. 14 shows components of an example embodiment of an application evaluation server.

FIG. 14 shows example components which may be implemented in an application evaluation server 170. The application evaluation server 170 may include a plurality of data stores, including a test results database 1342, an applications database 1344, and a test scripts database 1346. The test results database 1342 may store results of various tests performed by the application evaluation server 170 on third-party applications. The applications database 1344 may store data associated with one or more third-party applications which are to be tested or have already been tested by the application evaluation server 170. For example, the applications database 1344 may contain, for each application that requests access to the protected data resource 150, application data such as unique identifier of application, type of application, account data requested by the application, provider or developer of the application, etc. The test scripts database 1346 may store various scripts to be executed in testing third-party applications. Such test scripts may, for example, be predefined and stored in the application evaluation server 170.

In some embodiments, the application evaluation server 170 may locally host one or more sandbox testing environments, such as a sandbox 1330. Alternatively, or additionally, the sandbox 1330 may be at least partially hosted at a site external to the application evaluation server 170. For example, the sandbox 1330 may be executed within a cloud computing architecture. The sandbox 1330 represents a testing environment which allows for isolated testing of software, such as a third-party application. In particular, the application evaluation server 170 may implement a sandbox model of testing to evaluate the behavior of third-party applications in accessing user data at the protected data resource 150.

As shown in FIG. 14, the sandbox 1330 may include resource components, such as API simulators 1332 and an operating system emulator 1334, which provide various resources for executing one or more third-party applications and simulating a run-time environment. For example, an API simulator 1332 may simulate a real API associated with an access control server 140 and/or protected data resource 150. The sandbox 1330 may also include a plurality of test accounts 1336, which may be created for testing purposes. The test accounts 1336 may, for example, contain fake or partially fake account data which may be provided to third-party applications that request access to account data from the protected data resource 150.

The application evaluation server 170 may be configured to create test instances of third-party applications that are being evaluated. As illustrated in FIG. 14, the sandbox 1330 may include test instances 1338 of one or more third-party applications. In at least some embodiments, the test instances 1338 may be executed concurrently, to facilitate concurrent testing of multiple different applications that request access to the protected data resource 150.

In some embodiments, the access control server 140 and the application evaluation server 170 may be implemented by a single computing system. In particular, a single server may implement both functions of evaluating third-party application behavior and controlling access to a protected data resource 150. For example, when a new third-party application requests to access user account data at a protected data resource 150, a server associated with the protected data resource 150 may first test the behavior of the requesting application. If the requesting application's behavior is determined to be satisfactory based on the test results, the server may grant, to the requesting application, access to user account data at the protected data resource 150.

The client device 110, the access control server 140, the application evaluation server 170, and the application server 180 may be in geographically disparate locations. Put differently, the client device 110 may be remote from one or both of the access control server 140, the application evaluation server 170, and the application server 180.

The client device 110, the access control server 140, the application evaluation server 170, and the application server 180 are computer systems. The client device 110 may take a variety of forms including, for example, a mobile communication device such as a smartphone, a tablet computer, a wearable computer such as a head-mounted display or smartwatch, a laptop or desktop computer, or a computing device of another type.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2:
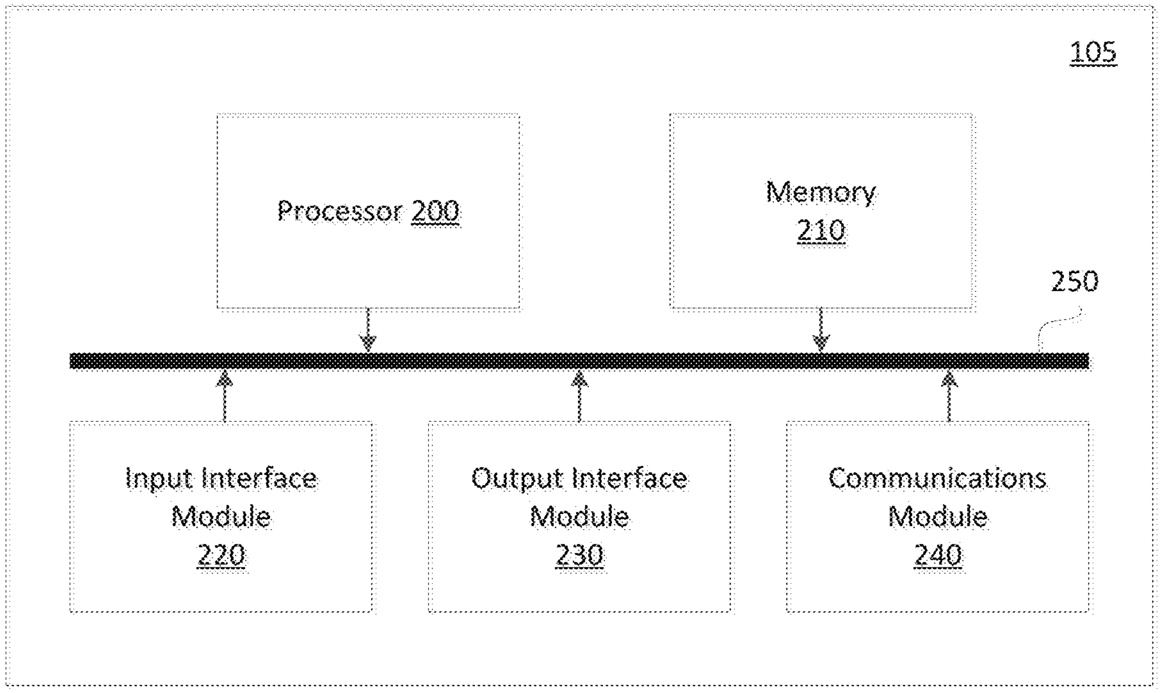
FIG. 2 is a high-level schematic diagram of an example computing device.

FIG. 2 is a high-level operation diagram of the example computing device 105. In some embodiments, the example computing device 105 may be exemplary of one or more of the client device 110, the access control server 140, and the third-party application server 180. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. The processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned exemplary input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by an output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. The communications module 240 may allow the example computing device 105 to communicate using near-field communication (NFC), via Wi-Fi (TM), using Bluetooth (TM) or via some combination of one or more networks or protocols. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 3:
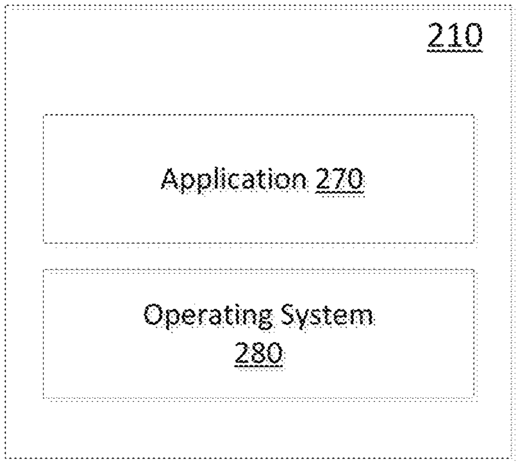
FIG. 3 shows a simplified organization of software components stored in memory of the example computing device of FIG. 2.

FIG. 3 depicts a simplified organization of software components stored in memory 210 of the example computing device 105. As illustrated these software components include an operating system 280 and an application 270.

The operating system 280 is software. The operating system 280 allows the application 270 to access the processor 200, the memory 210, the input interface module 220, the output interface module 230 and the communications module 240. The operating system 280 may be, for example, Apple's iOS™, Google's Android™, Linux™, Microsoft's Windows™, or the like.

The application 270 adapts the example computing device 105, in combination with the operating system 280, to operate as a device performing particular functions. For example, the application 270 may cooperate with the operating system 280 to adapt a suitable embodiment of the example computing device 105 to operate as the client device 110, the access control server 140, the application evaluation server 170, and the application server(s) 180.

While a single application 270 is illustrated in FIG. 3, in operation, the memory 210 may include more than one application 270, and different applications 270 may perform different operations. For example, in embodiments where the computing device 105 is functioning as a client device 110, the application 270 may comprise a value transfer application which may, for example, be a personal banking application. The value transfer application may be configured for secure communications with the access control server 140 and may provide various banking functions such as, for example, the ability to display a quantum of value in one or more accounts (e.g., display balances), configure transfers of value (e.g., bill payments and other transfers), and other account management functions. The value transfer application may allow data sharing with third-party application servers to be configured. The client device 110 may also include a PFM application, which may configure the client device 110 for communication with at least one application server 180.

Figure 4:
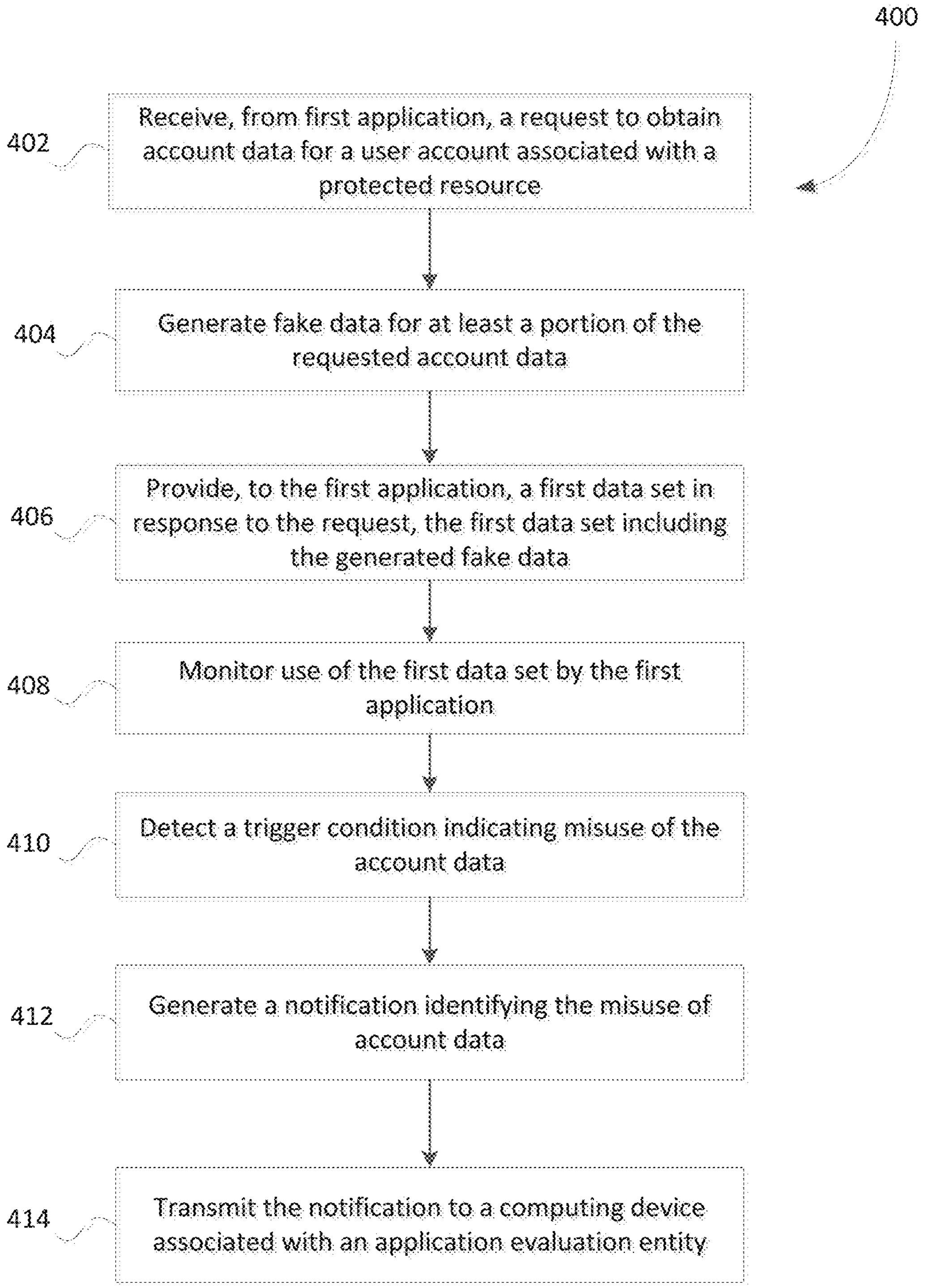
FIG. 4 shows, in flowchart form, an example method for evaluating the data security of a third-party application using fake account data.

Reference is made to FIG. 4, which shows, in flowchart form, an example method 400 for evaluating the data security of a third-party application. Specifically, the method 400 allows for assessing the data security of a third-party application that has been granted access, or attempts to gain access, to a protected data resource. For example, the operations of the method 400 may be performed in testing various third-party applications on a user's device for potential data security vulnerabilities.

Operations 402 and onward may be performed by one or more processors of a computing device such as, for example, the processor 200 (FIG. 2) of one or more suitably configured instances of the example computing device 105 (FIG. 2). The method 400 may be performed, for example, by a server system that is communicably connected to application servers associated with various third-party applications. More generally, an application evaluation system (such as the application evaluation server 170 of FIG. 1) may be configured to perform all or some of the operations of method 400.

In operation 402, the server receives, from a first application, a request to obtain first account data for a user account associated with a protected data resource. The request may be received directly from the first application (e.g. a third-party application resident on a client device), or it may be received from an application server, such as application server 180 of FIG. 1, that is associated with the first application. For example, the request from the first application may be in the form of a request to an API ("API call") for interfacing with the protected data resource. As a user interacts with the first application, the user may select one or more functionalities of the first application that require account data for an account of the user. For example, a user may input a request on a PFM application to aggregate financial transactions data for a bank account associated with the user. In response to receiving the user input, the first application may generate a request to retrieve certain account information (e.g. historical listing of transactions) for the user's bank account, and transmit the request to the server (or an access control entity for the bank database).

The request by the first application to obtain first account data for a user account may include, at least, identifying information for the user account, an identifier of the first application, login credentials of the user requesting to obtain the first account data, and the type(s) of account data that is requested. The request may be transmitted directly from the user's client device, or it may be formatted at an application server associated with the first application and transmitted to the application evaluation server and/or access control server.

In operation 404, the server generates fake data for at least a portion of the requested first account data. Specifically, the server generates data that is to be used for evaluating the first application. In at least some embodiments, the type(s) of data that is generated by the server depends on the specific account data that is requested by the first application. In particular, the server may generate fake data that is of the same type as parts or all of the requested first account data, such that the generated data can be provided to the first application in place of real account data.

For example, if the first application requests to obtain transactions data associated with an account of the user, the server may generate fake transactions data that can be provided to the first application. The fake transactions data may, for example, include a historical listing of fake transactions. Each fake transaction may be associated with a transaction amount and a timestamp (e.g. date, time). The transaction amount may be positive for transactions that increase a balance of the user's account and negative for transactions that decrease the balance. The fake transaction data may also include other information, such as a transaction type (e.g. wire transfer, check deposit, withdrawal, cash deposit, etc.), a transaction identifier, and identities of any recipients.

Additionally, or alternatively, the fake data generated in operation 404 may include other fake account information such as personal data (e.g. name, date of birth, social insurance number, address, contact information, account number, etc.) and account balance.

In some embodiments, the server may generate fake data for only a subset of the requested first account data. That is, fake data may be generated for only a portion of the account data that is requested by the first application. For example, the server may identify a certain subset of the first account data (e.g. account data fields) for which fake data is to be generated, and generate fake data for only the identified subset.

In at least some embodiments, the fake data generated by the server for account data requested by the first application may be uniquely associable with the first application. In particular, the server may generate different sets of fake account data for different third-party applications that are evaluated by the server. For example, for any two different applications that are tested by the application evaluation server, the sets of fake account data which are generated for the two applications may be distinct. The unique mapping of fake data sets to third-party applications may allow for detection, by an application evaluation entity, of a source of a security breach (e.g. data leak). The sets of fake data which are generated for various different third-party applications may be stored by the server, either locally or at a remote hosting site.

In operation 406, the server provides, to the first application, a first data set in response to the request. The first data set includes, at least, the fake data that is generated by the server in operation 404. For example, the first data set may include fake historical transactions data associated with the user account. The fake historical transactions data may include data for at least one fake transfer operation of transferring value to or from the user account. The data for a fake transfer operation may include, among others, a value transferred by the fake transfer operation, a date associated with the fake transfer operation, a transfer type of the fake transfer operation, and a transfer identifier associated with the fake transfer operation.

In at least some embodiments, the first data set may comprise both real and fake account data. Specifically, the first data set that is provided to the first application may include both real account data for a user that has elected to share account information with the first application and fake account data generated by the server. In particular, fake account data may be combined with real account data for the user. For example, the first data set may include one or more fake transactions which are inserted into a historical listing of real transactions for a user account. The fake transactions may be uniquely associated with the first application. That is, the set of fake transactions generated by the server and included in the first data set may be unique to the first application. Thus, the fake transactions generated for the first application may not be provided to any other third-party application. In this way, the fake transactions (and more generally, fake account data) which are provided to third-party applications may effectively act as a watermark on real account data that would allow for determining the source of a security breach, such as data leak or misuse.

In operation 408, the server monitors use of the first data set by the first application. Based on the monitoring, the server may determine when and how the data items of the first data set are utilized by the first application. In at least some embodiments, monitoring use of the first data set may include obtaining output data generated by the first application and evaluating the output data to determine whether different portions of the first data set have an effect on the output data. Specifically, the server may collect various data that is output by the first application and determine whether at least some of the fake data items of the first data set have an effect on the output data.

For example, the output data may include display data generated by the first application. The display data may include, for example, data presented in application pages of a graphical user interface associated with the first application. The server may “crawl” the application pages to search for the fake data items of the first data set. In particular, the server may search the display data associated with one or more of the application pages to try to locate different ones of the fake data items. The search of display data may span across all application pages of the first application or only a subset of the application pages. For example, the server may iterate through all possible application pages or only a predetermined subset of all application pages, and search the display data associated with said application pages for the fake data items.

As another example, the output data may include output code generated by the first application. That is, the server may obtain output code associated with the first application and evaluate the output code to determine whether any of the fake data items affects the output code. In particular, the server may obtain code that is outputted by the first application based on utilizing the first data set. For example, the output code of the first application may be searched to determine whether it contains one or more of the fake data items of the first data set.

In at least some embodiments, monitoring use of the first data set may include performing a search of resources in a network based on a search query that includes portions of the first data set. For example, the server may perform keyword searches of a network, such as the Internet or the dark web, using search queries that include one or more of the fake data items. That is, the server may “crawl” the network to search for any of the fake data items which were provided to the first application. The server may, for example, search the content of web pages using keywords associated with the fake data items. The search may be a generic web search, or it may be a directed search of predetermined resources (e.g. web pages associated with certain entities, web pages where application data was previously leaked, etc.).

In operation 410, the server detects a trigger condition indicating a misuse of account data. In particular, based on monitoring use of the first data set by the first application, the server may detect an indication that a data security breach (e.g. data leak) and/or redundant data access has occurred.

For example, the server may perform searches of a network for one or more of the fake data items when monitoring use of the first data set by the first application, in operation 408. If the server locates at least one of the fake data items, it may determine that data has been leaked to the network. As explained above, the fake data provided to the first application may be unique to that application. If a fake data item that is unique to the first application is found during a search of the network, the server may identify the first application as being the source of the data leak.

In at least some embodiments, a trigger condition may be associated with one or more predefined thresholds. By way of example, the server may determine that a data breach has occurred if the server detects at least a threshold quantity of fake data in a search of a network. A threshold may be defined as, for example, a percentage (e.g. certain percentage of the first data set or the fake data portion of the first data set) value or a frequency (e.g. number of times that parts of the fake data are located in the search of the network). If the percentage of the fake data detected during the search is greater than a threshold percentage, or if the number of times that the fake data is detected during the search exceeds a threshold frequency, the server may determine that a security breach (and/or misuse of account data) has occurred.

As another example, the server may evaluate output data generated by first application, in operation 408. If the server detects that one or more of the fake data items does not affect the output data, it may determine that the first application is retrieving more data than is required for its operations. The server may, for example, collect display data for various different application pages of the first application to determine whether the display content of the first application is affected by the fake data items. For example, the server may perform crawling, screen-scraping, optical character recognition, etc. on the application pages of the first application. Alternatively, or additionally, the server may obtain output code generated by the first application. The output code may be program code that is generated when the first application is executed using the first data subset as input.

The output data of the first application can then be searched for the fake data items. In particular, search queries that include the fake data items can be used to search the output data. For example, the output data may be searched for each fake data item that is included in the first data set.

If the server detects that one or more fake data items is not being utilized by the first application in generating output data, it may identify a misuse of the retrieved data (e.g. retrieval of redundant data). For example, if a certain fake data item is not found in a search of the output data of the first application, the fake data item may be determined to be redundant data, or data that is not required to be retrieved by the first application.

When monitoring the output data of the first application, the server may be configured to evaluate only certain subsets of the output data. For example, the server may collect display output data for a predetermined set of application pages of the first application and determine, based on the collected output data, whether the fake data, or portions thereof, is affecting the outputs of the first application. If, after searching output data associated with the predetermined set of application pages, the server determines that certain fake data values are not affecting the outputs of the first application, the server may conclude that the fake data values represent redundant data which ought not to be retrieved by the first application. In other words, the evaluation of whether certain fake data retrieved by the first application are redundant is limited to a subset of all possible permutations of outputs of the first application.

In response to detecting a trigger condition indicating misuse of account data, the server generates a notification identifying the misuse of the account data, in operation 412. For example, the notification may indicate a type of data security threat associated with the first application, such as a data leak or retrieval of redundant data. The notification may identify the first application as being a potential source of the data security threat, a timestamp (e.g. date, time) associated with the detection, a network in which the fake data was detected, and any portions of the fake data that are determined to not be utilized by the first application. In some embodiments, the notification may also provide a risk score indicating a level of risk associated with the first application. A risk score for a third-party application may be obtained based on, for example, a frequency of detection of data security threat, types and quantity of data that is determined to have been leaked, type and quantity of account data that is accessed by the application, identity of the network(s) in which leaked data was detected, etc. The notification generated in operation 412 may also provide suggestions on how to remedy the detected data security vulnerabilities. For example, the notification may provide information about alternative applications having similar functionalities as the first application, suggest modifications to user consent for the first application to access the account data, or recommend revoking data access privileges granted to the first application.

In operation 414, the server transmits the notification to a computing device associated with an application user. That is, the application evaluation server may issue a notification regarding any data security threat or misuse of user account data. For example, the notification may be sent to the client device from which the third-party request to obtain account data originated. In this way, the user of the client device may be notified of potential security vulnerabilities associated with granting the first application access to the user's account data.

In at least some embodiments, the server may perform other actions based on detecting misuse of account data. For example, the server may automatically revoke access to all or parts of the user account data for the first application. That is, the access permissions for the first application to access user account data may be modified. As another example, the server may update a risk score associated with the first application to reflect the misuse of account data. If the server detects a data leak or redundant retrieval of data by the first application, a risk score of the first application may be updated by the server (e.g. risk score is increased) to indicate an elevated risk associated with allowing the first application to access user account data.

Figure 5:
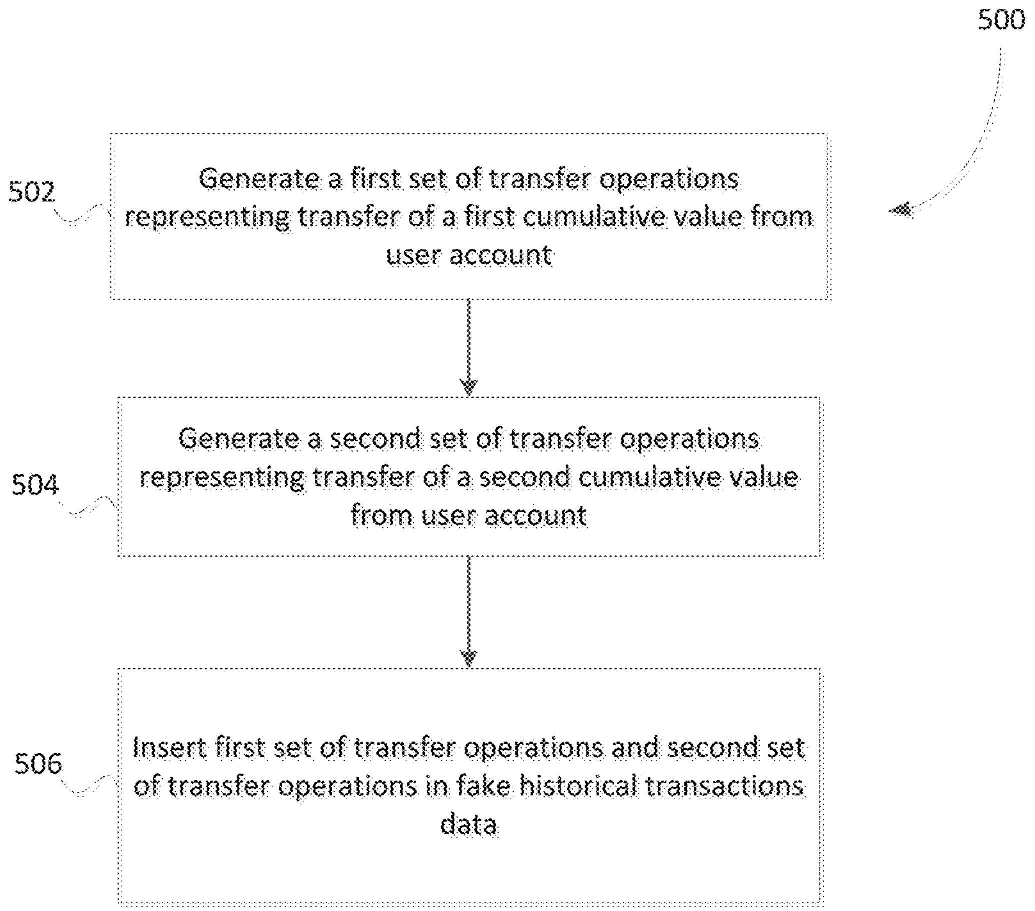
FIG. 5 shows, in flowchart form, an example method for generating fake data for use in evaluating the data security of a third-party application.

Reference is now made to FIG. 5, which shows, in flowchart form, an example method 500 for generating fake data for use in evaluating the data security of a third-party application. The method 500 may be implemented by one or more processors of a computing device, such as an application evaluation server. In at least some embodiments, the operations of method 500 may be implemented as part of method 400 of FIG. 4. In particular, the operations 502 to 506 may be performed as sub-routines of operation 404 of method 400.

As described above, an application evaluation server may generate fake data for use in testing the data security of third-party applications. In particular, the fake data may be included in a data set that is provided to a third-party application in response to a request by the application to obtain user account data. If the fake data portion is easily recognizable, the third-party application server may be configured to identify and remove the fake data portion from the data set. The operations of method 500 are designed to prevent detection of fake data by third-party applications. In particular, these operations may make it difficult for a third-party to determine which portions of the account data set that is provided to the third-party application are fake and which portions correspond to real user account data.

In operation 502, the server generates a first set of fake transfer operations representing transfer of a predetermined first amount from the user account. The first set may include one or more fake credit transactions for the user account, totaling a value equal to the first amount. That is, the total transfer value represented by the first set of fake transfer operations is equal to the first amount. In some embodiments, the first set may include at least a threshold number of fake credit transactions. For example, the first set may be required to include more than one credit transaction.

In operation 504, the server generates a second set of fake transfer operations, with a total transfer value that is equal to the first amount. The second set may include one or more fake debit transactions for the user account. The second set represents fake transfer operations which are designed to offset the effect of the first set of fake transfer operations on a balance associated with the user account. That is, the first and second sets of fake transfer operations are generated such that the net effect of the fake transfer operations on the actual balance of the user account is zero. In some embodiments, the second set may include at least a predefined number of fake debit transactions. For example, the second set may be required to include more than one debit transaction.

Once the first and second sets of fake transfer operations have been generated, the server may insert the fake transfer operations in the transactions data for a real user account, in operation 506. For example, the fake transfer operations may be included in a historical listing of transactions for a user account. The transfer operations may be associated with different transaction types, amounts, and/or timestamps (e.g. date, time).

Figure 6:
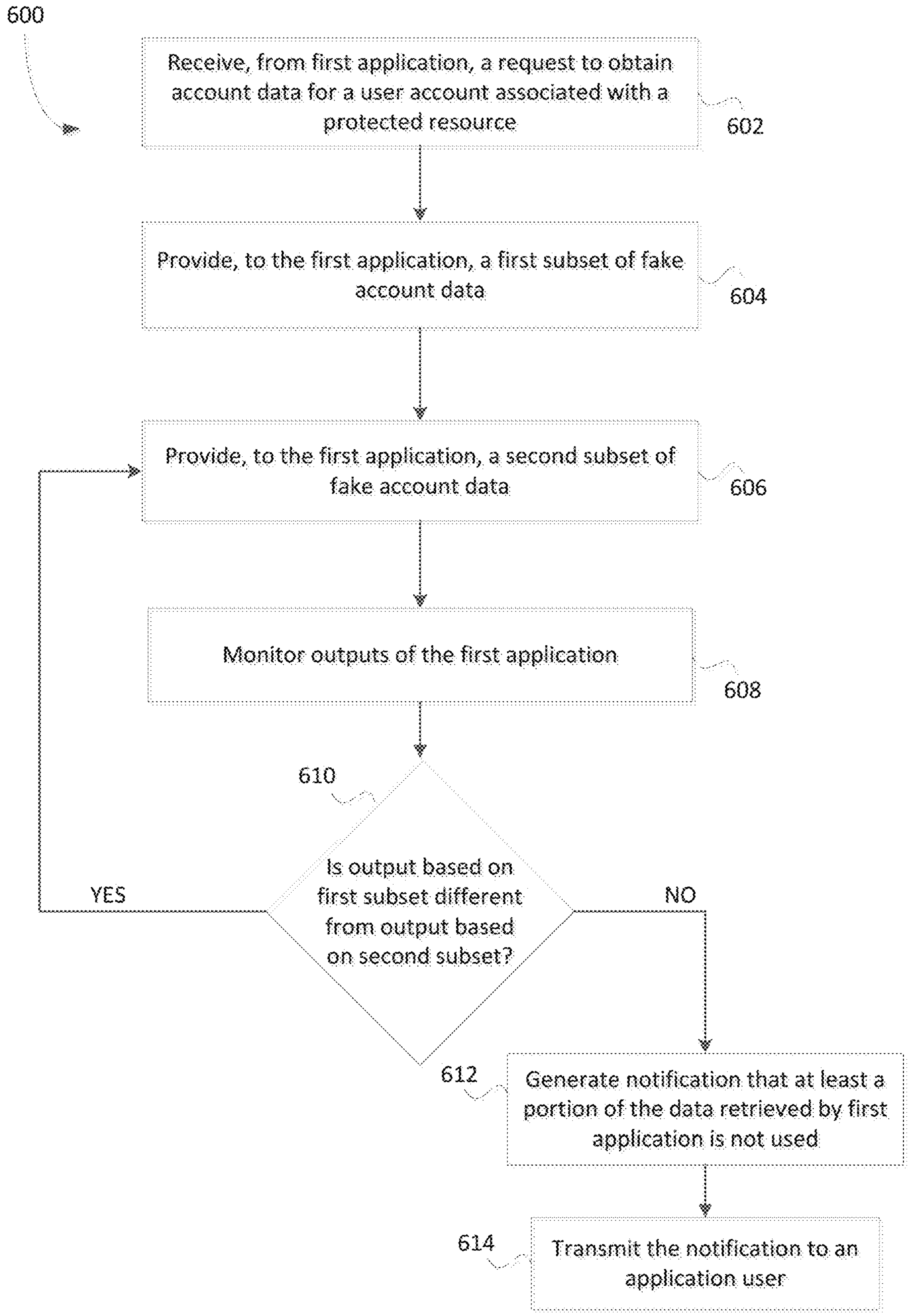
FIG. 6 shows, in flowchart form, another example method for evaluating the data security of a third-party application using fake account data.

Reference is made to FIG. 6, which shows, in flowchart form, another example method 600 for evaluating the data security of a third-party application that has been granted access, or attempt to gain access, to a protected data resource. Specifically, the method 600 allows for testing third-party applications to determine whether they collect more data than is required when obtaining account data for a user account. The method 600 may be implemented by one or more processors of a computing device. Specifically, the operations 602 and onward may be performed by an application evaluation server for evaluating the behavior of a third-party application in collecting and utilizing user account data. The operations of method 600 may be performed as alternatives or in addition to the operations of method 400 described above.

In operation 602, the server receives, from a first application, a request to obtain account data for a user account associated with a protected data resource. The operation 602 may be performed in a similar manner as operation 402 of method 400. In particular, the request may include, at least, identifying information for the user account, an identifier of the first application, login credentials of the user requesting to obtain the first account data, and the type(s) of account data that is requested.

Upon receiving the request, the server generates a first subset of fake account data and provides the first subset to the first application, in operation 604. The server then generates a second subset of fake account data and provides the second subset to the first application, in operation 606. The first subset and the second subset contain almost identical data but vary in one aspect. In particular, the first subset may represent control data and the second subset may represent test data, where the control data and the test data differ in a single data parameter. For example, the second subset may be generated by simply changing one data value of the first subset.

The server may be configured to automatically monitor outputs of the first application, in operation 608. For example, after the two subsets of fake account data have been provided to the first application, the server may perform crawling, screen-scraping, optical character recognition, or other form of monitoring of application output data associated with the first application. In particular, the server monitors outputs of the first application that are based on using the first subset of fake account data and compares those outputs with outputs of the first application that are based on using the second subset of fake account data. That is, the server obtains two sets of output data corresponding to the first and second subsets of fake account data.

The server then determines, in operation 610, whether the output data sets are different. Specifically, the server attempts to determine whether the data item that was changed between the two subsets of fake data is of a type that is actually being used by the first application. If the two subsets of fake account data produce different output data sets, it may be an indication that the data item that was varied actually affects output of the first application. If, however, the two subsets of fake account data produce the same output data sets, the server may determine that the output of the first application is not affected by a change of the data item. In other words, the server may identify the data item as representing redundant data that is collected by the first application.

Upon determining that the output data sets do not differ, the server may notify an application user (or other entity associated with the first application) that at least some account data collected by the first application is not used. In operation 612, the server generates a notification that at least a portion of the data retrieved by the first application is redundant, and in operation 614, the server transmits the notification to an application user (e.g. a client device associated with the application user).

By iteratively changing data items in the control data set, the application evaluation server may identify data that is actually used by the first application (i.e. affects output of the first application) and data that is not used by the first application. In particular, if the server determines that a certain test data set produces an application output that is different from an output corresponding to the control data set, operations 606 to 610 may be repeated for evaluating a different test data set to determine whether another data item may be redundant.

Figure 7:
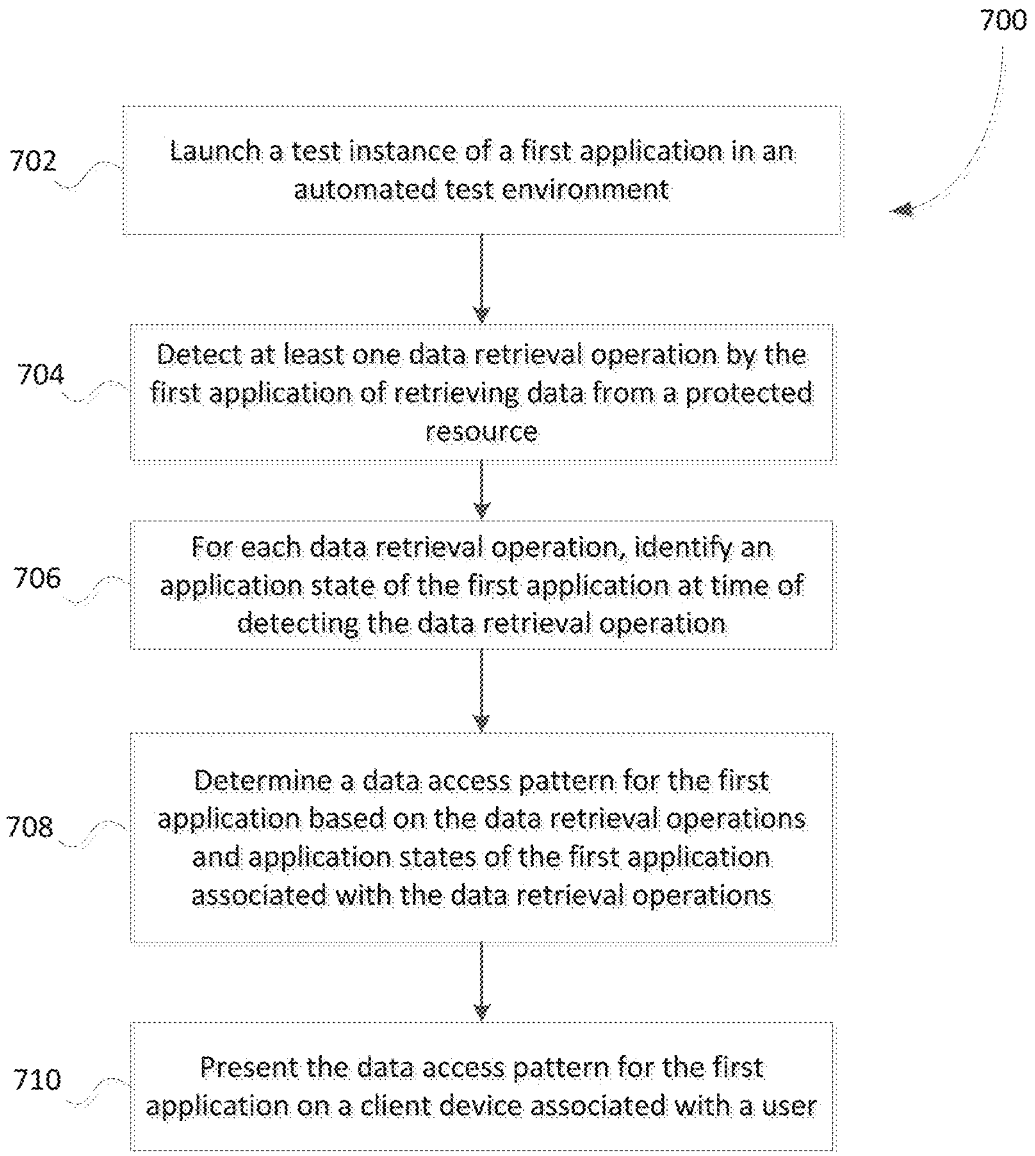
FIG. 7 shows, in flowchart form, an example method for evaluating the data security of a third-party application based on determining a pattern of data access by the third-party application.

Reference is made to FIG. 7, which shows, in flowchart form, an example method 700 for evaluating the data security of a third-party application, based on determining a pattern of data access by the third-party application. The method 700 may be implemented by one or more processors of a computing device, such as an application evaluation server. The operations 702 and onward may be performed as alternatives or in addition to the operations of methods 400 and 600 described above.

When user data is shared with third-party applications, different applications may access the data in different ways. For example, some applications may access the user data immediately when the application is run on a client device, while other applications may only access user data when a particular functionality that requires user data is selected. Some applications may access user data even when the application is not in use. For example, an application may periodically (e.g. daily, monthly, or at other scheduled intervals) retrieve user data from a remote data resource. While such periodic retrieval of data may allow the application to process user data more efficiently, frequent sharing of user data may increase the risk of data security breaches—transmission of data, even in an encrypted format, can elevate the risk of interception of the data by malicious parties. Further, fresh data is inherently riskier and more vulnerable than stale data, as stale data (e.g. old transaction data, etc.) may be of lesser value than updated data if such data were to fall into the wrong hands.

As described below, an application evaluation server may determine a data access pattern for a third-party application. A data access pattern describes a pattern of access operation, performed by a third-party application, for accessing account data of a user account in a protected data resource. Accordingly, a data access pattern for a third-party application is associated with one or more user accounts that the application accesses in order to retrieve account data. Understanding the pattern of data access by a third-party application may enable an application evaluation entity to assess risk levels associated with the application and its various operations, anticipate potential data security vulnerabilities, and provide recommendations for mitigating security risks or alternatives for the application.

An application evaluation server may determine a data access pattern by running automated tests on the application. The tests may be performed, for example, in a sandboxed testing environment. The sandbox may, for example, include one or more emulators including an operating system (e.g. iOS, Android, etc.) emulator.

In operation 702, the server launches, in an automated test environment, a test instance of a first application. For example, the server may execute a virtual machine which simulates the operations of the first application. In particular, the test instance of the first application is configured to perform data access operations of accessing account data of at least one user account in a protected data resource.

In operation 704, the server detects at least one data retrieval operation by the first application of retrieving data from a protected data resource. Specifically, the server receives, from the first application, one or more requests to retrieve account data from the user account. The requests may be received directly from a client device on which the first application resides, or from a third-party server associated with the first application. A request for data retrieval may include, for example, identity of the first application, type(s) of account data that is requested, and identifying information for the user account.

For each of the at least one data retrieval operation, the server identifies an application state of the first application at a time of detecting the at least one data retrieval operation, in operation 706. When the server receives a request for data retrieval from the first application, the server determines a corresponding application state of the first application at a time of detecting the data retrieval request. For example, for each data retrieval operation, a mapping of the data retrieval operation to an application state may be determined by the server. In some embodiments, the server may determine the type(s) of account data that are obtained by the at least one data retrieval operation.

An application state may, for example, be an execution state of the first application. That is, the application state may be an indicator of whether the first application is being executed (i.e. application is in use) or not executed (non-use). The server may determine, in operation 706, whether or not the first application is being executed when the at least one data retrieval operation is detected.

Additionally, or alternatively, an application state may indicate a particular application page, feature, or function that is accessed on the first application. For example, an application state may identify an application page of the first application that a user is currently viewing or otherwise interacting with.

In operation 708, the server determines a data access pattern for the first application of accessing the protected data resource. The data access pattern is determined based on monitoring the at least one data retrieval operation by the first application and application states of the first application associated with the at least one data retrieval operation. The data access pattern may be used in categorizing the first application based on its data retrieval behavior. By way of example, the first application may be categorized as: an application that only retrieves data when the application is executed; an application that periodically retrieves data, but at a low retrieval frequency; an application that periodically retrieves data at a high retrieval frequency; or an application that only retrieves data when certain functionalities of the application that require user data are selected, for example, by user input.

In some embodiments, the server may be configured to put the test instance of the first application through various different operations to determine whether the first application retrieves user data in response to performing such operations. In particular, the server may cause the test instance to perform a plurality of predetermined operations of the first application and monitor for data retrieval activities. A data access pattern for the first application may be generated based on the monitoring of operations which trigger data retrieval by the first application.

For example, the server may perform "crawling" operations on the first application (i.e. navigating to various screens or pages of the first application) and monitor whether the first application retrieves user data in response to one or more of the navigation operations.

In operation 710, the data access pattern for the first application is presented on a client device associated with a user. For example, the data access pattern may be presented as part of data security evaluation results of the first application.

Figure 8:
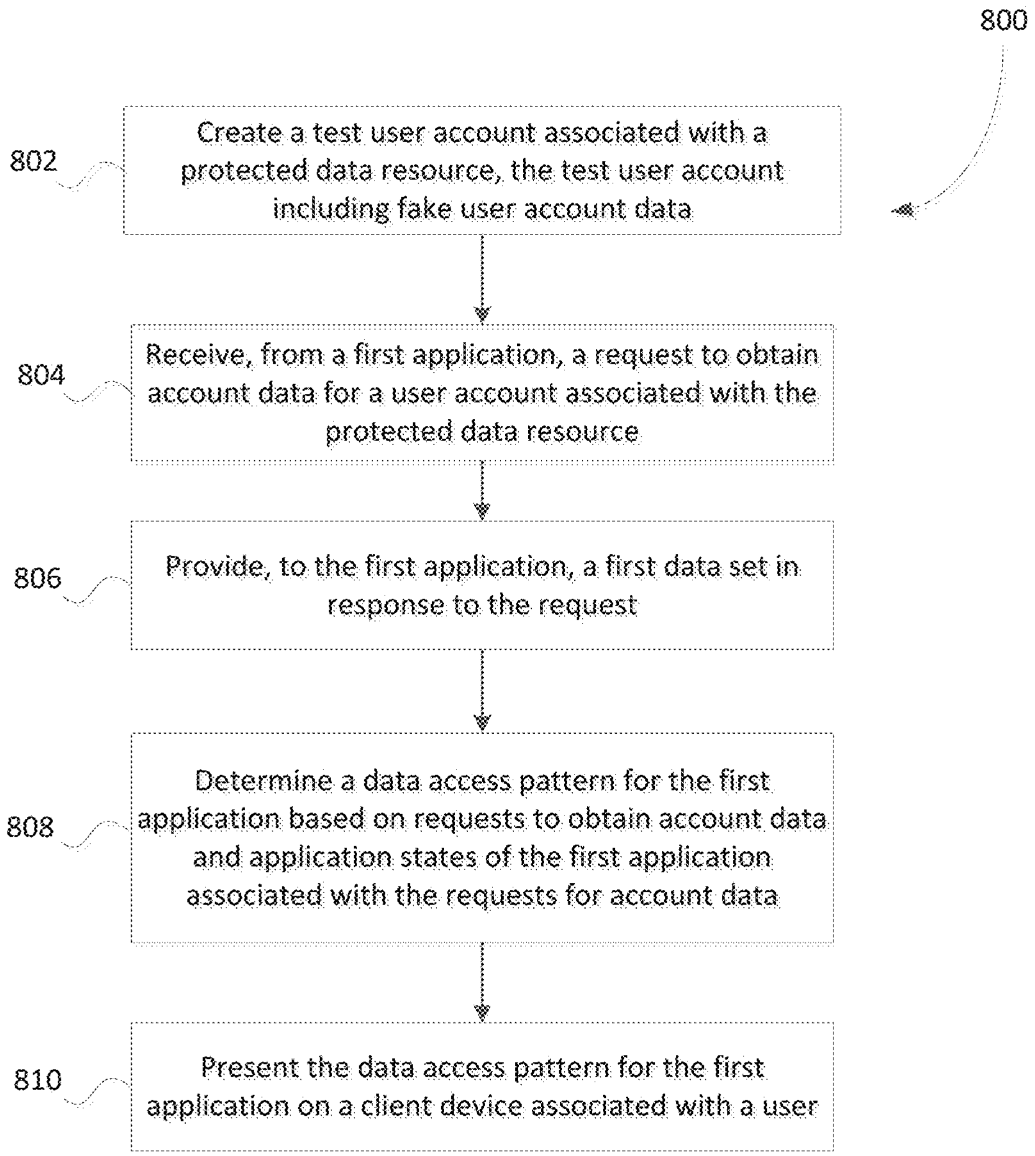
FIG. 8 shows, in flowchart form, another example method for evaluating the data security of a third-party application based on determining a pattern of data access by the third-party application.

Reference is made to FIG. 8, which shows, in flowchart form, another example method 800 for evaluating the data security of a third-party application, based on determining a pattern of data access by the third-party application. Specifically, the operations of method 800 may be performed in determining a data access pattern of accessing, by a first application, account data for a user account in a protected data resource. The method 800 may be implemented by one or more processors of a computing device, such as an application evaluation server.

In some cases, the evaluation of data access pattern information for a third-party application may be performed using fake data in place of real account data. In particular, a test user account may be created for use in evaluating a data access pattern. The server creates a test user account associated with the protected data resource, in operation 802. The test user account includes fake data. For example, the fake data may comprise fake user account data, such as fake historical transactions data and fake personal data (e.g. fake name, address, etc.). The fake historical transactions data may include, for example, data for at least one fake transfer operation of transferring value to or from the test user account. In some embodiments, the fake historical transactions data may comprise a plurality of fake credit and debit transactions that are generated by the server.

In operation 804, the server receives, from the first application, a request to obtain account data for a user account associated with the protected data resource. As a response to the request, the server may provide, to the first application, a first data set that includes at least the fake data of the test user account, in operation 806. In particular, the first data set may include fake user account data that is generated by the server.

The server may then determine, in operation 808, a data access pattern for the first application based on requests, by the first application, to obtain account data and one or more application states of the first application associated with such requests. For example, the server may determine mappings of account data retrieval requests to application states for the first application. The server then presents the data access pattern for the first application on a client device associated with a user, in operation 810. Operations 808 and 810 may be performed in a similar manner as operations 708 and 710 of method 700, respectively.

Figure 9:
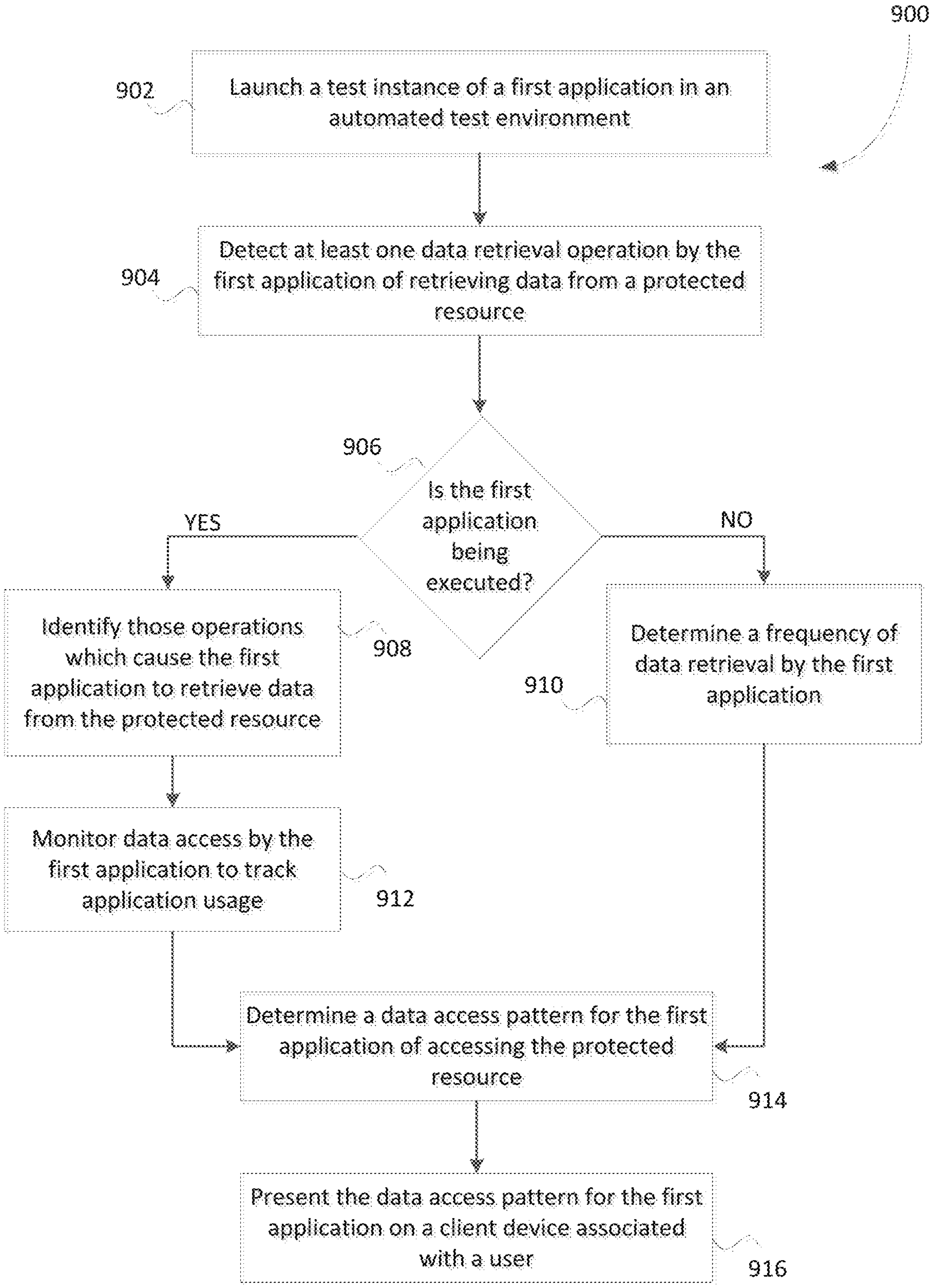
FIG. 9 shows, in flowchart form, another example method for evaluating the data security of a third-party application based on determining a pattern of data access by the third-party application.

Reference is made to FIG. 9, which shows, in flowchart form, another example method 900 for evaluating the data security of a third-party application, based on determining a pattern of data access by the third-party application. The operations of method 900 may be performed by one or more processors of a computing system, such as an application evaluation server.

In operation 902, the server launches a test instance of a first application in an automated test environment. The server then monitors for requests, from the first application, to retrieve user data from a protected data resource, in operation 904. The operations 902 and 904 may be performed in a similar manner as operations 702 and 704 of method 700, respectively.

Upon receiving a data retrieval request from the first application, the server determines an application execution state of the first application. That is, in operation 906, the server determines whether the first application is being executed or not being executed. If the first application is being executed at the time of the data retrieval request, the server may be configured to identify those operations which cause the first application to retrieve user data, in operation 908. For example, the server may identify one or more functionalities of the first application which initiate data retrieval operations by the first application. In some embodiments, the data retrieval operations may be performed in response to a user-initiated action in the first application. For example, the first application may receive a user selection of a functionality associated with the first application that requires user data. In response to receiving such user input, the first application may generate a request to obtain certain user data, such as account data for a user account in a protected data resource.

In operation 912, the server may monitor data access by the first application to track application usage. If an application is categorized as one that accesses data when the application is being executed (i.e. in use), the server may determine whether the application is being used or has recently been used. Usage data may be useful, for example, for notifying a user of an application that is no longer being used but that still has access to the user's data. If a user is no longer using an application, it may be preferred to cancel that application's access privileges for accessing the user's data. For example, the server may detect non-use of a third-party application by confirming that the application has not accessed user data for at least a predefined threshold time period. Based on the monitoring, the server may provide, to the user, a notification indicating application usage data for the first application, or take an action regarding the first application's data access privileges. For example, the server may revoke or modify the access permissions for the first application to access account data for the user.

If, on the other hand, the server determines that the first application is not being executed at the time of the data retrieval request, the server may determine a frequency of data retrieval. Upon determining that the first application accesses user data during periods of non-use, the server may obtain a retrieval frequency or period (e.g. whether the first application retrieves user data daily, weekly, monthly, etc.).

The server then determines a data access pattern for the first application of accessing the protected data resource, in operation 914, and presents the data access pattern on a client device associated with a user. In at least some embodiments, the data access pattern may include data relating to, for example, the operations which cause the first application to retrieve user data (identified in operation 908), application usage data for the first application (obtained in operation 912), and/or a frequency of data retrieval by the first application during periods of non-use (determined in operation 910).

Figure 10:
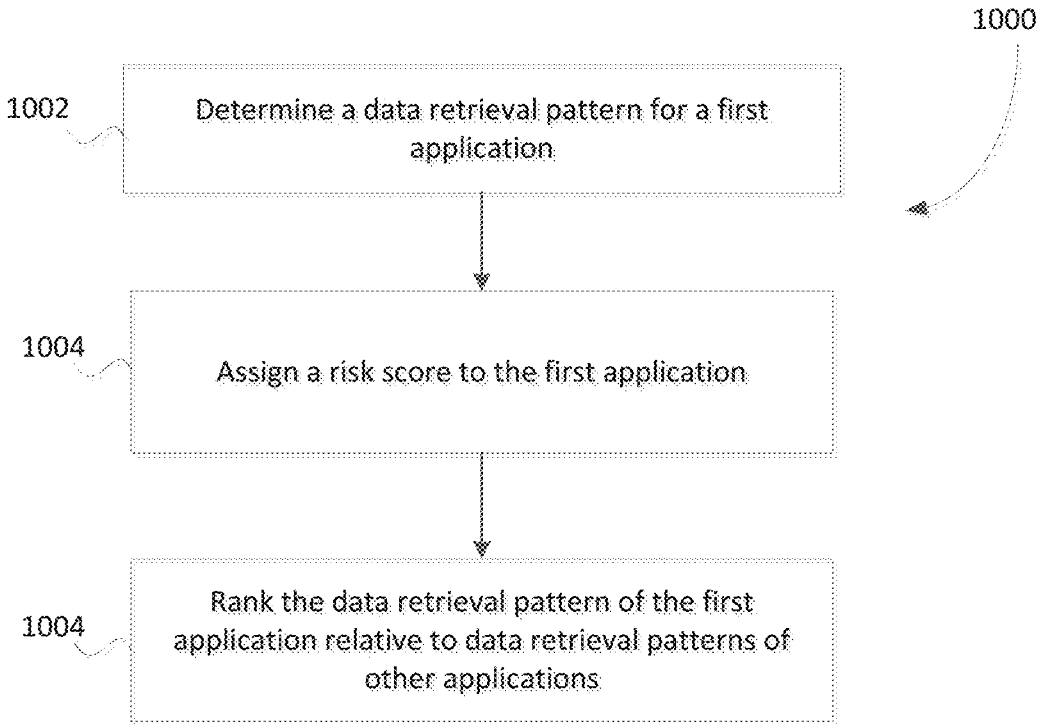
FIG. 10 shows, in flowchart form, an example method for ranking third-party applications based on their respective data access patterns.

Reference is made to FIG. 10, which shows, in flowchart form, an example method 1000 for ranking third-party applications based on their respective data access patterns. The operations of method 1000 may be performed by one or more processors of a computing system, such as an application evaluation server. The method 1000 may be implemented as part of or in addition to the methods described above.

In operation 1002, the server determines a data retrieval pattern for a first application. The data retrieval pattern may be obtained according to techniques described above with respect to methods 700, 800 and 900. Based on the data retrieval pattern, the first application may be associated with a risk score. In operation 1004, the server assigns a risk score for the first application. Generally, the server assigns a better (e.g. lower) risk score for applications that are deemed to have safe data access/retrieval patterns. For example, an application that only retrieves data when a user selects a certain functionality that requires user data would be assigned a better risk score than an application that retrieves user data periodically, even during periods of non-use, at a high frequency. The risk score determined for the first application may be displayed to a user. The risk score information may be displayed, for example, when a user is prompted to consent to data sharing with the first application.

In some embodiments, the server may compare the data retrieval pattern of the first application with the patterns of other applications. Specifically, the server may generate a ranking of applications based on the "risk level" associated with the applications' data retrieval patterns. Such ranking may be useful for a device user in deciding whether to use a certain application or whether to opt for an alternative application that serves similar functions and has a better lower risk level for its data access behavior.

When a user consents to share their data with a third-party application, it is desirable to monitor for any changes to the application's (or associated third-party server's) behavior. If the data access behavior of the application changes after user consent is given, the user should be notified of the changes such that they can be kept up-to-date on the various parameters of access (e.g. frequency, type(s) of data retrieved, etc.) of user data by the application. In this way, the user can exercise informed control of access to the user's data by third-parties.

Figure 11:
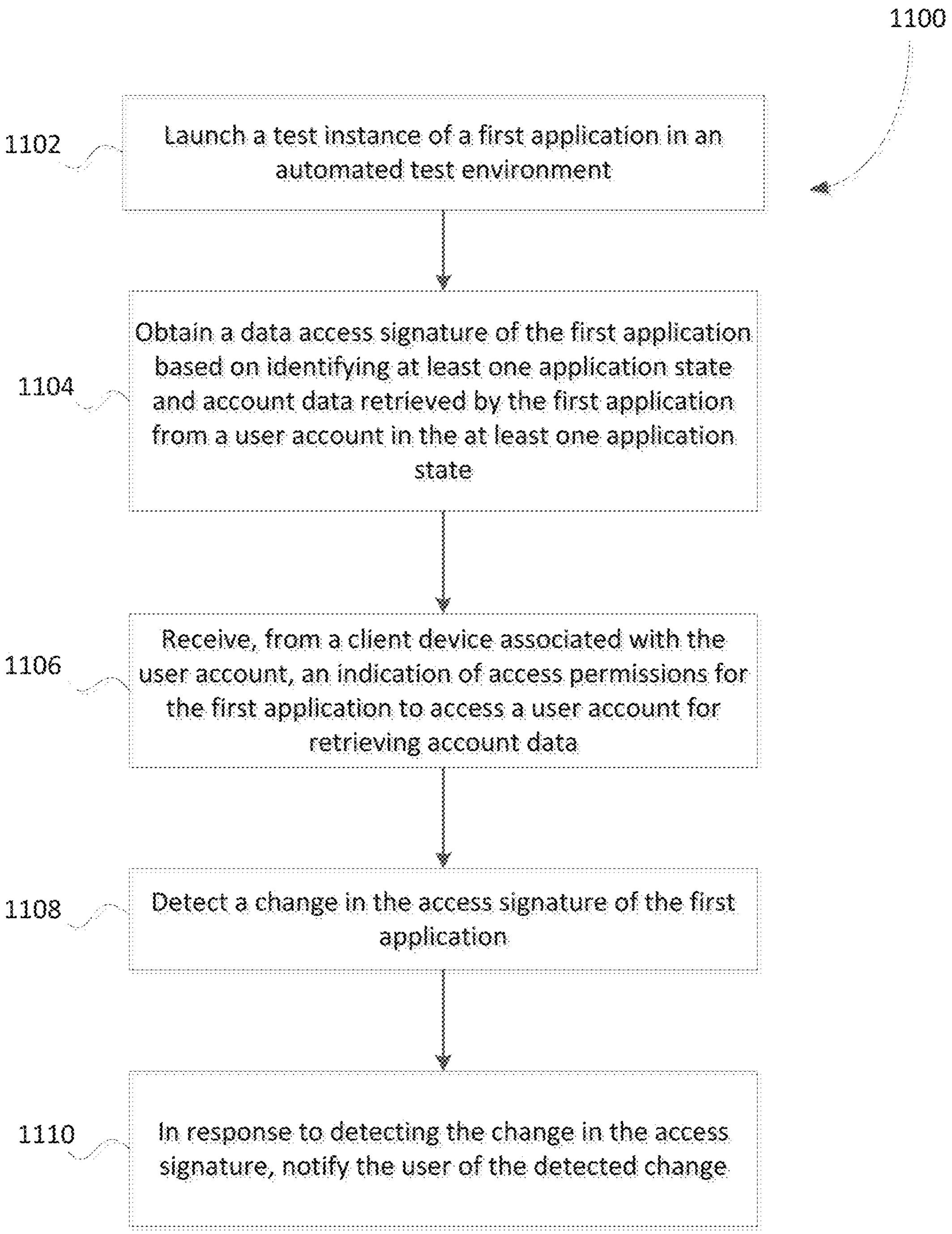
FIG. 11 shows, in flowchart form, an example method for evaluating the data security of a third-party application based on monitoring for changes in data access activity by the third-party application.

Reference is made to FIG. 11, which shows, in flowchart form, an example method 1100 for evaluating the data security of a third-party application. Specifically, the method 1100 allows for monitoring changes in data access behavior by a third-party application. The operations of method 1100 may be performed by one or more processors of a computing system, such as an application evaluation server.

In operation 1102, the server launches a test instance of the first application in an automated test environment, such as a sandbox. The server then obtains a data access signature of the first application, in operation 1104. The data access signature is a representation of the behavior of the first application in accessing data that the user has consented to share with the application. The data access signature is obtained based on identifying at least one application state of the first application and user account data that is retrieved by the first application in the at least one application state.

In at least some embodiments, the at least one application state of the first application comprises an execution state of the first application. That is, the application state indicates whether the first application is being executed (i.e. application has been launched or is in use) or not being executed (non-use). The data access signature may thus indicate, for at least one application execution state of the first application, account data which is retrieved by the first application. In some embodiments, the data access signature may indicate the types of account data which are accessed by the first application in various application execution states. By way of example, certain data may be accessed when the first application is not running, certain data may be accessed when the first application is launched, and certain data may be accessed when a particular graphical user interface (e.g. display of an application page) of the application is displayed.

In some embodiments, the data access signature may indicate, for one or more application states of the first application, a frequency of retrieval of account data by the first application. For example, the server may determine a schedule of data retrievals by the first application, which may include, for example, determining period of time between consecutive data retrieval operations, any pre-defined times for data retrievals, etc.

In at least some embodiments, the data access signature may include a data access pattern, as described above with reference to methods 700 to 1000 in FIGS. 7 to 10. Generally, a data access pattern may be determined by performing automated test processes on the application in a sandboxed test environment. For example, fake user data may be provided to an application, and an application evaluation entity may monitor the application state(s) (e.g. execution state) together with data retrieval operations by the application.

In some embodiments, the data access signature may be determined using artificial intelligence. For example, in a test environment, inputs and outputs of the first application may be monitored in order to obtain a data access signature.

In operation 1106, the server receives, from a client device associated with the user account, an indication of access permissions for the first application to access a user account for retrieving account data. That is, the server receives consent from the user for the first application to access user account data.

When the data access signature for the first application is determined, it may be stored together with the access permissions, i.e. user's consent. The access permissions for the first application may be stored in association with the data access signature by the server.

Figure 12:
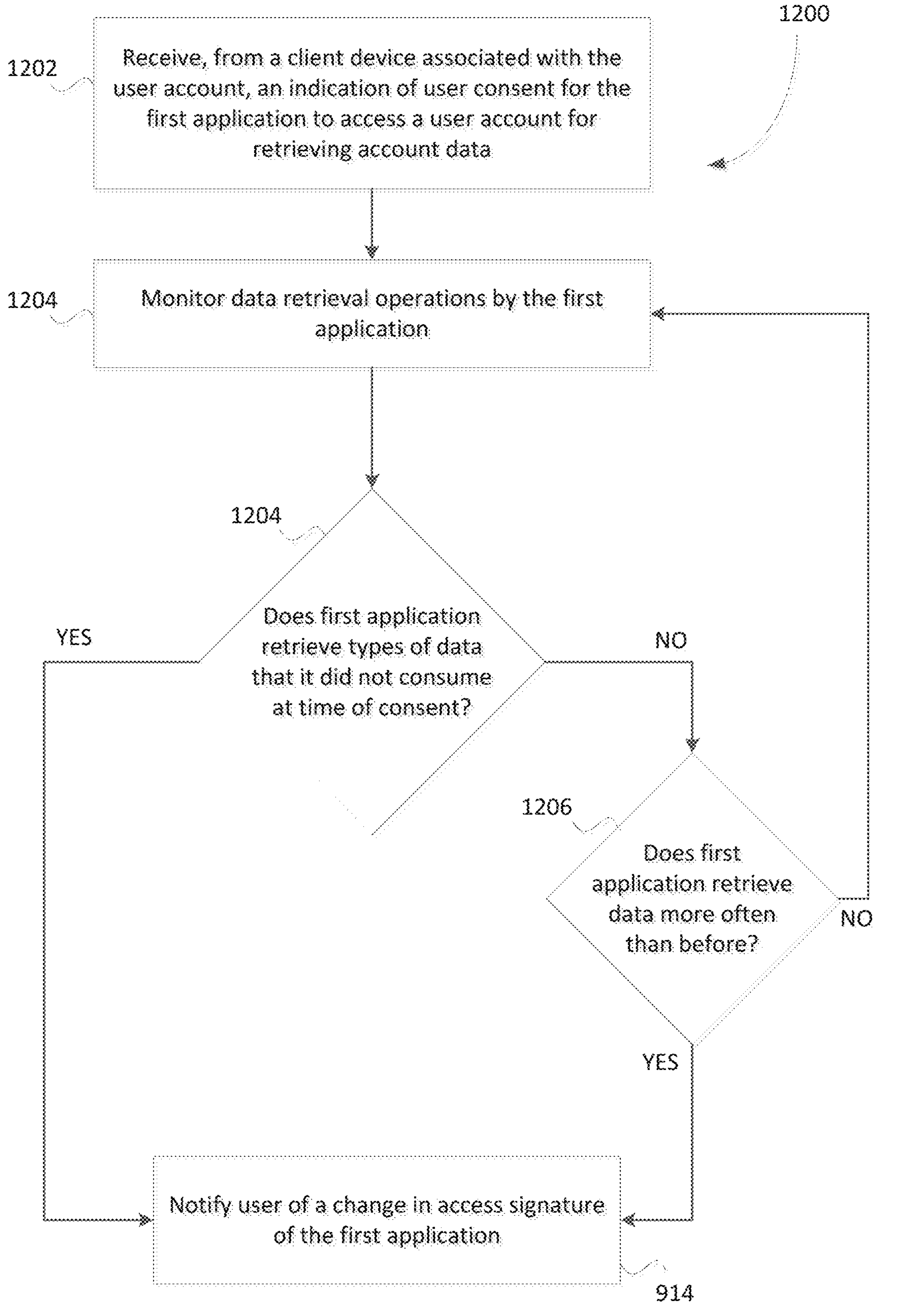
FIG. 12 shows, in flowchart form, another example method for evaluating the data security of a third-party application based on monitoring for changes in data access activity by the third-party application.

The server then continues to monitor the first application to determine whether its data access behavior changes. In operation 1108, the server detects a change in the data access signature of the first application. FIG. 12 shows an example method for monitoring for changes to the data access signature of an application. Operations 1202 to 1208 may, for example, be performed as sub-routines of the operation 1108 of method 1100, by an application evaluation server.

When monitoring, in operation 1202, data retrieval operations by the first application, the server may detect that the first application retrieves a type of account data that it did not retrieve at the time of the user's consent. In particular, for at least one of the application states of the first application, the server may determine that the first application retrieves data that is of a different type than the type(s) of data which were accessed at the time of consent. In response to detecting such retrieval to a new type of account data, the server may notify a user of a change in access signature of the first application.

Additionally, the server may detect that the data access signature has changed upon detecting that, in at least one of the application states, the first application retrieves account data from the user account more frequently than a frequency at which data was retrieved (or proposed to be retrieved) at the time of user consent.

Thus, in response to detecting the change in the access signature, the server notifies the user of the detected change, in operations 1110 and 1208. In some embodiments, the notification may indicate, among other information, the nature of the change in the data access signature (or data access behavior of the first application) and a time of detection of the change.

Figure 13:
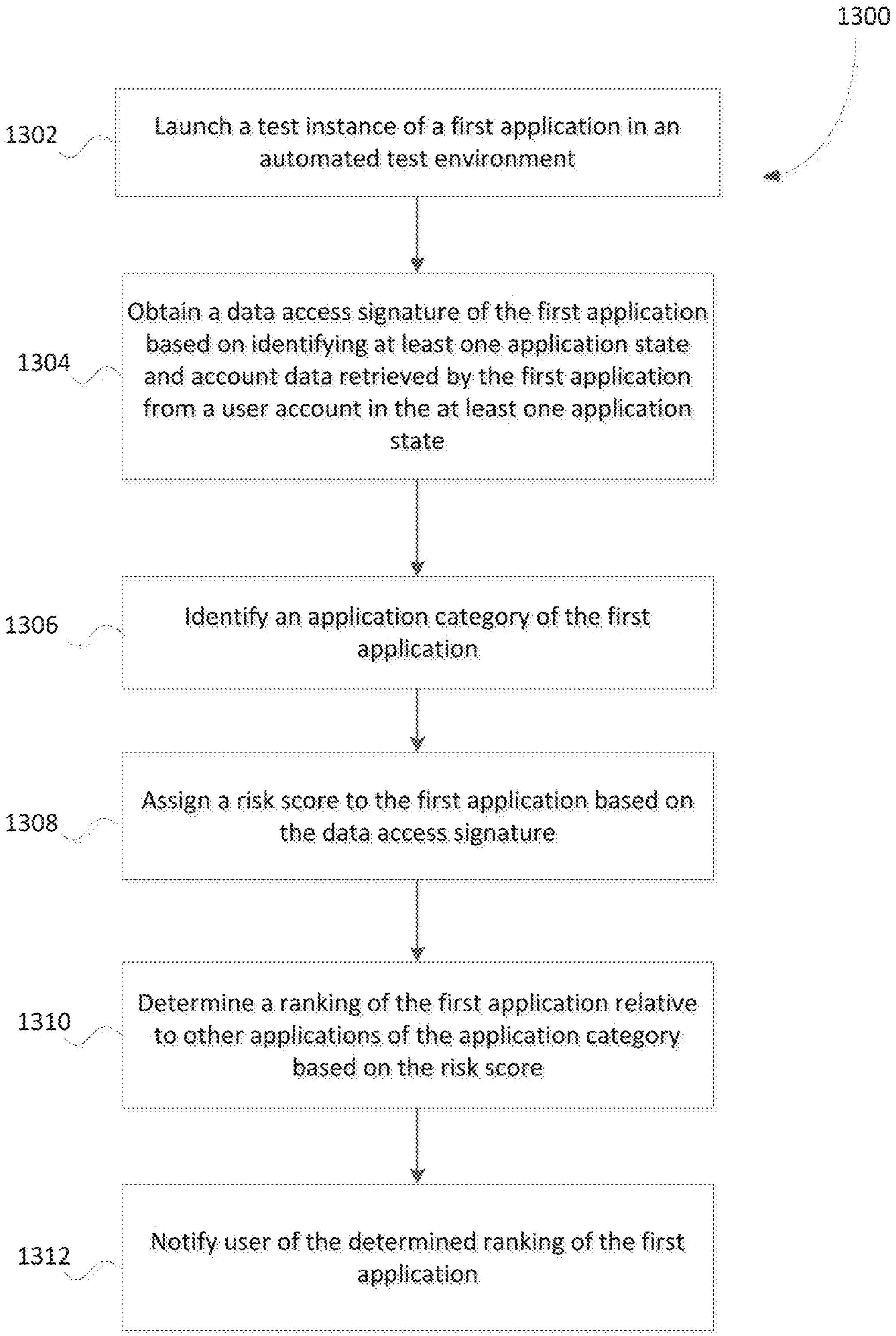
FIG. 13 shows, in flowchart form, an example method for ranking third-party applications based on their risk scores.

Reference is made to FIG. 13, which shows, in flowchart form, an example method 1300 for ranking third-party applications based on their risk scores. The risk scores are determined based on, for example, automated test processes for evaluating the data security of the third-party applications. The operations of method 1300 may be performed by one or more processors of a computing system, such as an application evaluation server.

In operation 1302, the server launches a test instance of a first application in an automated test environment. The server then obtains a data access signature of the first application, in operation 1304. The data access signature is based on at least one application state and account data retrieved by the first application in the at least one application state. For example, the data access signature may indicate mappings of data retrieval operations by the first application to the application states in which those data retrieval operations are performed.

The server identifies an application category for the first application, in operation 1306. The categorization may, for example, be based on the application's purpose or features (e.g. "personal financial manager" may be one category). The server may then assign, to the first application, a risk score that is based on the data access signature for the first application, in operation 1308.

Further, in some embodiments, the applications of a given category may be ranked based on their respective risk scores, in operation 1310. Applications that access less data or that access data only when needed (e.g. when a functionality requiring user data is selected) or that access data less frequently may generally receive more favorable scores.

In operation 1302, the server notifies a user of the determined ranking of the first application relative to other applications of its own category. For example, the ranking of the first application may be included in a notification of a detected change in data access signature for the first application. The ranking information may be useful for a user in deciding whether to replace the first application with an alternative in the same category with a higher rank.

The example embodiments of the present application have been described above with respect to third-party applications that are resident on a user's client device. It should be noted, however, that the disclosed systems and methods may be applicable more generally for managing user account access requests by various different types of third-party applications or services. For example, the third-party applications may be cloud-based applications that are available to users on-demand via a computer network (e.g. Internet), or web-based applications that are hosted on the web and run in a web browser.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:

a processor; and a memory coupled to the processor, the memory storing computer-executable instructions that, when executed by the processor, configure the processor to:

launch a test instance of a first application by executing a virtual machine simulating operations of the first application;

obtain a data access signature of the first application representing account data retrieved by the test instance from a user account at a protected data resource, the data access signature indicating at least one of type of account data accessed by the first application or frequency of retrieval of account data by the first application;

receive, via a client device associated with the user account, an indication of access permissions for the first application to access the user account for retrieving account data;

detect a change in the data access signature based on monitoring data retrieval operations by the first application; and in response to detecting the change in the data access signature, transmit, to the client device, a notification indicating the detected change in the data access signature.

2. The computing system of claim 1, wherein the instructions, when executed, further configure the processor to store the data access signature in association with the access permissions for the first application.

3. The computing system of claim 1, wherein the instructions, when executed, further configure the processor to detect one or more data retrieval operations via server requests by the test instance for retrieving account data from the user account and wherein the data access signature is determined based on the detected one or more data retrieval operations.

4. The computing system of claim 1, wherein the test instance is launched in an automated test environment comprising an emulator for an operating system associated with the first application.

5. The computing system of claim 1, wherein the data access signature indicates, for at least one application state of the first application, first types of account data accessed by the first application and a first frequency of retrieval of account data by the first application.

6. The computing system of claim 5, wherein detecting the change in the data access signature comprises detecting that, in the at least one application state, the first application retrieves a type of account data that is different from the first types.

7. The computing system of claim 5, wherein detecting the change in the data access signature comprises detecting that, in the at least one application state, the first application retrieves account data from the user account more frequently than the first frequency.

8. The computing system of claim 1, wherein the instructions, when executed, further configure the processor to:

identify an application category for the first application; and assign, to the first application, a risk score that is based on the data access signature for the first application.

9. The computing system of claim 8, wherein the instructions, when executed, configure the processor to determine a ranking of the first application relative to one or more other applications of the application category based on the risk score.

10. The computing system of claim 1, wherein the data access signature is obtained using artificial intelligence.

11. A processor-implemented method, comprising:

launching a test instance of a first application by executing a virtual machine simulating operations of the first application;

obtaining a data access signature of the first application representing account data retrieved by the test instance from a user account at a protected data resource, the data access signature indicating at least one of type of account data accessed by the first application or frequency of retrieval of account data by the first application;

receiving, via a client device associated with the user account, an indication of access permissions for the first application to access the user account for retrieving account data;

detecting a change in the data access signature based on monitoring data retrieval operations by the first application; and in response to detecting the change in the data access signature, transmitting, to the client device, a notification indicating the detected change in the data access signature.

12. The method of claim 11, further comprising storing the data access signature in association with the access permissions for the first application.

13. The method of claim 11, further comprising detecting one or more data retrieval operations via server requests by the test instance for retrieving account data from the user account, wherein the data access signature is determined based on the detected one or more data retrieval operations.

14. The method of claim 11, wherein the test instance is launched in an automated test environment comprising an emulator for an operating system associated with the first application.

15. The method of claim 11, wherein the data access signature indicates, for at least one application state of the first application, first types of account data accessed by the first application and a first frequency of retrieval of account data by the first application.

16. The method of claim 15, wherein detecting the change in the data access signature comprises detecting that, in the at least one application state, the first application retrieves a type of account data that is different from the first types.

17. The method of claim 15, wherein detecting the change in the data access signature comprises detecting that, in the at least one application state, the first application retrieves account data from the user account more frequently than the first frequency.

18. The method of claim 11, further comprising:

identifying an application category for the first application; and assigning, to the first application, a risk score that is based on the data access signature for the first application.

19. The method of claim 18, further comprising determining a ranking of the first application relative to one or more other applications of the application category based on the risk score.

20. The method of claim 11, wherein the data access signature is obtained using artificial intelligence.

* * * * *